United States Patent
Koh et al.

(10) Patent No.: US 11,507,781 B2
(45) Date of Patent: *Nov. 22, 2022

(54) METHODS AND SYSTEMS FOR AUTOMATIC GENERATION OF MASSIVE TRAINING DATA SETS FROM 3D MODELS FOR TRAINING DEEP LEARNING NETWORKS

(71) Applicant: Bodygram, Inc., Las Vegas, NV (US)

(72) Inventors: Chong Jin Koh, Las Vegas, NV (US); Kyohei Kamiyama, Tokyo (JP)

(73) Assignee: Bodygram, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/309,656

(22) PCT Filed: Dec. 17, 2019

(86) PCT No.: PCT/US2019/066994
§ 371 (c)(1),
(2) Date: Jun. 11, 2021

(87) PCT Pub. No.: WO2020/131970
PCT Pub. Date: Jun. 25, 2020

(65) Prior Publication Data
US 2022/0044070 A1    Feb. 10, 2022

Related U.S. Application Data

(63) Continuation of application No. 16/517,391, filed on Jul. 19, 2019, now Pat. No. 10,489,683.
(Continued)

(51) Int. Cl.
*G06K 9/62*    (2022.01)
*G06T 19/20*    (2011.01)
(Continued)

(52) U.S. Cl.
CPC .............. *G06K 9/6256* (2013.01); *G06N 3/04* (2013.01); *G06T 7/60* (2013.01); *G06T 11/00* (2013.01);
(Continued)

(58) Field of Classification Search
CPC .......... G06K 9/6256; G06N 3/04; G06T 7/60; G06T 11/00; G06T 19/20;
(Continued)

(56) References Cited

U.S. PATENT DOCUMENTS 5,737,506 A    4/1998    McKenna et al.
5,956,525 A    9/1999    Minsky
(Continued)

FOREIGN PATENT DOCUMENTS

GB    2402311 A    12/2004
WO    WO2011142655 A2    11/2011
(Continued)

OTHER PUBLICATIONS

Carlucci et al., "A deep representation for depth images from synthetic data", Computer Science > Computer Vision and Pattern Recognition, Nov. 16, 2017, pp. 1-8.
(Continued)

*Primary Examiner* — Solomon G Bezuayehu
(74) *Attorney, Agent, or Firm* — American Patent Agency PC; Daniar Hossain; Stephen M. Hou

(57) ABSTRACT

Disclosed are systems and methods for generating large data sets for training deep learning networks (DLNs) for 3D measurements extraction from 2D images taken using a mobile device camera. The method includes the steps of receiving a 3D model of a 3D object; extracting spatial features from the 3D model; generating a first type of augmentation data for the 3D model, such as but not limited to skin color, face contour, hair style, virtual clothing, and/or
(Continued)

lighting conditions; augmenting the 3D model with the first type of augmentation data to generate an augmented 3D model; generating at least one 2D image from the augmented 3D model by performing a projection of the augmented 3D model onto at least one plane; and generating a training data set to train the deep learning network (DLN) for spatial feature extraction by aggregating the spatial features and the at least one 2D image.

20 Claims, 20 Drawing Sheets

Related U.S. Application Data

(60) Provisional application No. 62/780,737, filed on Dec. 17, 2018.

(51) Int. Cl.
*G06T 11/00* (2006.01)
*G06T 7/60* (2017.01)
*G06N 3/04* (2006.01)
*G06V 10/40* (2022.01)
*G06V 40/10* (2022.01)

(52) U.S. Cl.
CPC .............. *G06T 19/20* (2013.01); *G06V 10/40* (2022.01); *G06V 40/103* (2022.01); *G06T 2207/20081* (2013.01); *G06T 2207/20084* (2013.01); *G06T 2207/30196* (2013.01)

(58) Field of Classification Search
CPC . G06T 2207/20081; G06T 2207/20084; G06T 2207/30196; G06V 10/40; G06V 40/103
See application file for complete search history.

(56) References Cited

U.S. PATENT DOCUMENTS

| | | | |
|---|---|---|---|
| 6,490,534 | B1 | 12/2002 | Pfister |
| 9,189,886 | B2 | 11/2015 | Black et al. |
| 9,292,967 | B2 | 3/2016 | Black et al. |
| 9,623,578 | B1 | 4/2017 | Aminpour et al. |
| 9,858,719 | B2 | 1/2018 | Dorner et al. |
| 10,157,416 | B2 | 12/2018 | Adeyoola et al. |
| 10,489,683 | B1 | 11/2019 | Koh et al. |
| 10,495,453 | B2* | 12/2019 | Abovitz ................. G06F 3/017 |
| 2012/0189178 | A1 | 7/2012 | Seong |
| 2014/0267273 | A1* | 9/2014 | Kontkanen ............ G06T 17/05 345/426 |
| 2014/0270540 | A1 | 9/2014 | Spector et al. |
| 2014/0277663 | A1 | 9/2014 | Gupta et al. |
| 2015/0324114 | A1* | 11/2015 | Hurley .................... G16Z 99/00 715/850 |
| 2017/0053442 | A1* | 2/2017 | Sumner ................ G06T 19/006 |
| 2017/0061625 | A1 | 3/2017 | Estrada et al. |
| 2017/0140578 | A1 | 5/2017 | Xiao et al. |
| 2017/0273639 | A1 | 9/2017 | Iscoe et al. |
| 2018/0047208 | A1* | 2/2018 | Marin .................. H04N 13/111 |
| 2018/0129865 | A1 | 5/2018 | Zia et al. |
| 2018/0181802 | A1 | 6/2018 | Chen et al. |
| 2019/0122424 | A1 | 4/2019 | Moore et al. |
| 2019/0180082 | A1* | 6/2019 | Moravec ............... G06T 19/006 |
| 2019/0325763 | A1* | 10/2019 | Hux .................... A63F 13/5255 |
| 2020/0183035 | A1* | 6/2020 | Liu ........................ G01V 1/303 |
| 2020/0380701 | A1* | 12/2020 | Buibas ................. G06V 40/103 |
| 2021/0201565 | A1* | 7/2021 | Dibra ..................... G16H 50/70 |
| 2022/0207849 | A1* | 6/2022 | Gausebeck .......... H04N 13/246 |

FOREIGN PATENT DOCUMENTS

| | | |
|---|---|---|
| WO | WO2014076633 A1 | 5/2014 |
| WO | 2017203262 A2 | 11/2017 |

OTHER PUBLICATIONS

Hinterstoisser et al., "On Pre-Trained Image Features and Synthetic Images for Deep Learning", Computer Science > Computer Vision and Pattern Recognition, Sep. 30, 2016, pp. 1-9.

Menglei Chai, et al., "AutoHair: Fully Automatic Hair Modeling from A Single Image," SIGGRAPH '16 Technical Paper, Jul. 24-28, 2016, Anaheim, CA, ISBN: 978-1-4503-4279-7/16/07, DOI: http://dx.doi.org/10.1145/2897824.2925961.

Guilin Liu, et al., "Image Inpainting for Irregular Holes Using Partial Convolutions", arXiv:1804.07723v2 [cs.CV], Dec. 15, 2018.

Proper Cloth LLC, "Proper Cloth, Design the perfect shirt" webpage, Available at: https://propercloth.com/design-a-shirt/, last accessed on Apr. 10, 2017.

Bit Body, Inc., MTailor webpage and mobile application, Available at: https://www.mtailor.com/, last accessed on Apr. 10, 2017.

AFT GMBH, "Tailor4less" webpage, Available at: https://www.tailor4less.com/en/men/custom-dress-shirts/, last accessed on Apr. 10, 2017.

Flex Japan Corporation, "Karuizawa shirt" webpage, Available at: http://karuizawa-shirt.jp/builder, last accessed on Apr. 10, 2017 with Google Translate.

3DLOOK Inc., "3D body scanning in the palm of your hand" webpage, Available at: https://3dlook.me/3dlook-technology/, last accessed on Oct. 9, 2018.

Agisoft, "PhotoScan—photogrammetric processing of digital images and 3D spatial data generation" webpage, Available at: http://www.agisoft.com, last accessed on Oct. 9, 2018.

Gabriel L. Oliveira, et al., "Deep Learning for Human Part Discovery in Images," 2016 IEEE International Conference on Robotics and Automation (ICRA), May 16-21, 2016, Stockholm, Sweden. DOI: 10.1109/ICRA.2016.7487304.

Alexandaer Toshev and Christian Szegedy, "DeepPose: Human Pose Estimation via Deep Neural Networks," IEEE Conference on Computer Vision and Pattern Recognition, 2014. DOI: 10.1109/CVPR.2014.214.

Gul Varol, et al., "BodyNet: Volumetric Inference of 3D Human Body Shapes," European Conference on Computer Vision 2018 (ECCV 2018), 27 pages. arXiv:1804.04875.

Stefanie Wuhrer, et al., "Estimation of Human Body Shape and Posture Under Clothing," Computer Vision and Image Understanding, 127, pp. 31-42, 2014. DOI: 10.1016/j.cviu.2014.06.012.

Alexandru Balan and Michael J. Black, "The Naked Truth: Estimating Body Shape Under Clothing." In: D. Forsyth, P. Torr, and A. Zisserman (Eds.), Computer Vision—ECCV 2008, Lecture Notes in Computer Science, vol. 5303. Springer, Berlin, pp. 15-29, 2008. DOI: https://doi.org/10.1007/978-3-540-88688-4_2.

Masahiro Sekine, et al., "Virtual Fitting by Single-Shot Body Shape Estimation," 5th International Conference on 3D Body Scanning Technologies, Lugano, Switzerland, pp. 406-413, Oct. 21-22, 2014. DOI: 10.15221/14.406.

Hengshuang Zhao, et al., "Pyramid Scene Parsing Network," CVPR 2017, Dec. 4, 2016, Available at: arXiv:1612.01105.

Leo Breiman, "Random Forests," Machine Learning, 45, 5-32, 2001, Kluwer Academic Publishers, Netherlands, Available at: https://doi.org/10.1023/A:1010933404324.

The Hong Kong Polytechnic University, "PolyU intelligent 3D human modelling technology projecting body shape and size accurately within 10 seconds", webpage available at: https://www.polyu.edu.hk/web/en/media/media_releases/index_id_6527.html.

Yihu, webpage available at: https://www.youtube.com/watch?v=vnCMfTOHvek.

Mtailor, "Custom Clothes, Guaranteed Fit", webpage available at: https://www.mtailor.com/.

Body Labs, webpage available at: https://en.wikipedia.org/wiki/Body_Labs.

Krinninger, Thomas, 2016. One-Shot 3D Body-Measurement. Master's thesis, Graz University of Technology, Graz, Austria. Retrieved from https://www.reactivereality.com/static/pdf/krinninger_master_thesis.pdf.

Liang-Chieh Chen, et al., "DeepLab: Semantic Image Segmentation with Deep Convolutional Nets, Atrous Convolution, and Fully

(56) References Cited

OTHER PUBLICATIONS

Connected CRFs," IEEE, May 12, 2017, webpage available at: https://ieeexplore.ieee.org/abstract/document/7913730.

Dan Song, et al., "Clothes Size Prediction from Dressed-human Silhouettes," Jun. 2017, State Key Lab of CAD&CG, Zhejiang University, Hangzhou, China, NCCA, Bournemouth University, Bournemouth, UK, webpage available at: https://www.researchgate.net/publication/320733122_Clothes_Size_Prediction_from_Dressed-Human_Silhouettes.

Sizer, "Size is never an issue," webpage available at: https://sizer.me/.

* cited by examiner

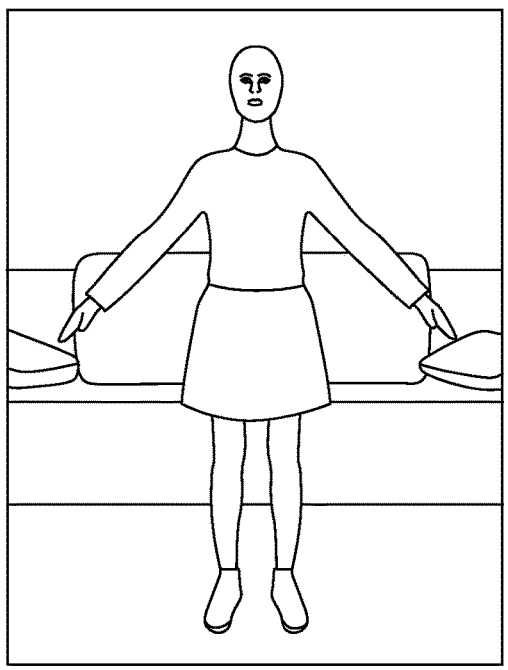 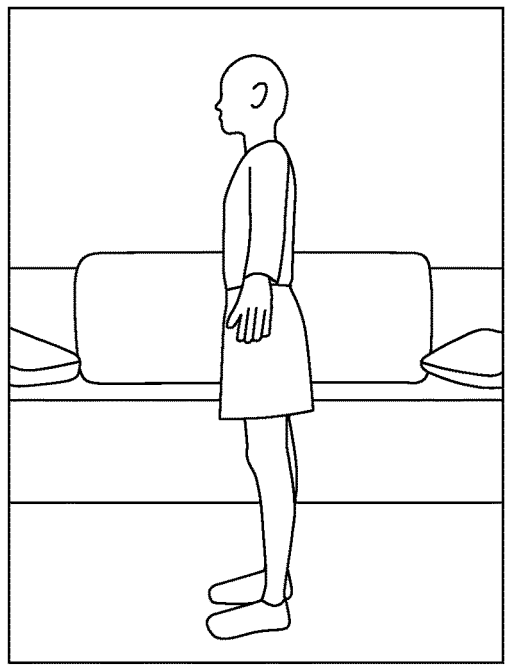
FIG. 6A  FIG. 6B

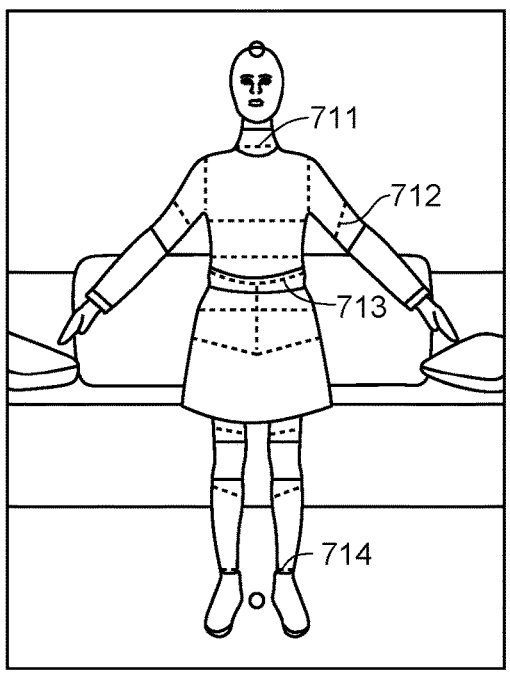
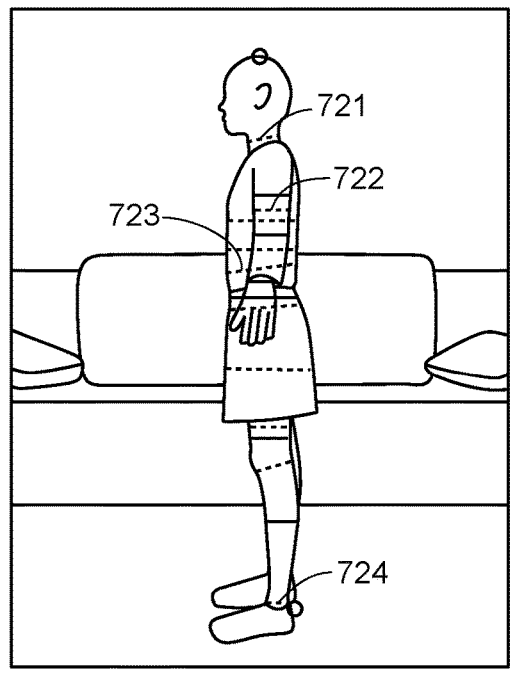
FIG. 7A     FIG. 7B

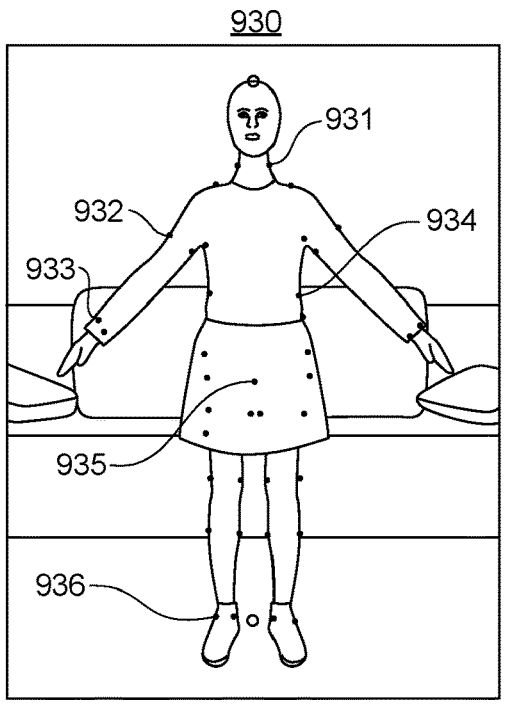
FIG. 9A
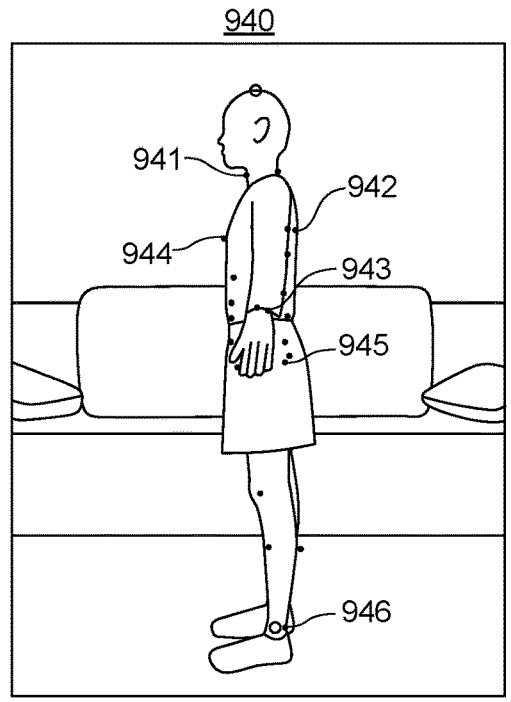
FIG. 9B
| BODY PART | SIZING RESULT [cm] |
|---|---|
| NECK | 33.2227 |
| SHOULDER | 39.7486 |
| SLEEVE | 73.3261 |
| WRIST | 15.3653 |
| BICEP | 25.1505 |
| CHEST | 84.5550 |
| WAIST | 67.7489 |
| HIGH HIP | 741808 |
| HIP | 90.2745 |
| THIGH | 53.2880 |
| THIGH TOP | 46.8228 |
| KNEE | 38.5886 |
| CALF | 362101 |
| TOTAL LENGTH | 134.7371 |
| OUTSEAM | 93.9295 |
| INSEAM | 73.7785 |
FIG. 9C

METHODS AND SYSTEMS FOR AUTOMATIC GENERATION OF MASSIVE TRAINING DATA SETS FROM 3D MODELS FOR TRAINING DEEP LEARNING NETWORKS

FIELD OF THE INVENTION

Embodiments of the present invention are in the field of automated 3D object measurements and pertain particularly to generating data sets for training deep learning algorithms for measurements of 3D objects using photos taken with a mobile device.

BACKGROUND OF THE INVENTION

The statements in the background of the invention are provided to assist with understanding the invention and its applications and uses, and may not constitute prior art.

There are several approaches that have been tried to extract 3D measurements from images of 3D objects, including utilizing specialized 3D cameras as well as utilizing 2D videos or 2D photos, followed by 2D-to-3D reconstruction techniques to estimate 3D measurements.

A promising new technique described in U.S. Pat. No. 10,321,728, issued on 18 Jun. 2019, filed as U.S. Ser. No. 16/195,802, filed on 19 Nov. 2018, and entitled "Systems and methods for full body measurements extraction" is to utilize deep learning networks to extract measurements from 2D photos taken using a single mobile device camera. This technique minimizes user frictions while promising to deliver highly accurate measurements. However, this approach may require large amounts of training data, including segmented and annotated front and side images, along with corresponding ground truth data, in order to train the deep learning networks. In practice, acquiring the large training data sets necessary for training deep learning networks may be difficult. Images have to be acquired from willing volunteers, segmented and annotated by human annotators, and matched with collected ground truth data of actual measurements.

Therefore, it would be an advancement in the state of the art to provide a process by which small data sets may be usefully amplified for training deep learning networks for measurements extraction. In this way, a small amount of data collected may be usefully amplified to create large data sets that may be used to train the deep learning algorithms for accurate measurements.

It is against this background that the present invention was developed.

BRIEF SUMMARY OF THE INVENTION

The present invention relates to methods and systems for generating large data sets for training deep learning networks for extracting 3D measurements from 2D images, taken for example from a mobile device camera. In short, in accordance with one embodiment, from a single 3D base mesh model from a pre-existing database or a body scanner, plus augmentation data (skin, face, hair, light, multiple virtual clothing, multiple virtual backgrounds, etc.), multiple datasets may be generated. The result is that from just a single 3D model (for example, one body scan), many thousands or even millions of training data sets may be generated. In summary according to one aspect, the present invention is a virtual space and human augmentation system for deep learning (DL) and machine learning (ML) dataset generation.

More specifically, in various embodiments, the present invention is a computer-implemented method for generating training data sets for training a deep learning network (DLN) for spatial feature extraction from two-dimensional (2D) images of a three-dimensional (3D) object, the computer-implemented method executable by a hardware processor, the method comprising receiving a 3D model of the 3D object; extracting spatial features from the 3D model; generating a first type of augmentation data for the 3D model; augmenting the 3D model with the first type of augmentation data to generate an augmented 3D model; generating at least one 2D image from the augmented 3D model by performing a projection of the augmented 3D model onto at least one plane; and generating a training data set to train the deep learning network (DLN) for spatial feature extraction by aggregating the spatial features and the at least one 2D image.

In one embodiment, the method further comprises receiving a second type of augmentation data for the at least one 2D image; augmenting the at least one 2D image with the second type of augmentation data to generate a plurality of augmented 2D images, each augmented 2D image containing the projection of the augmented 3D model and an instance of the second type of augmentation data; and generating the training data set to train the deep learning network (DLN) for spatial feature extraction by aggregating the spatial features and the plurality of augmented 2D images.

In one embodiment, the 3D model is a 3D human body model. In one embodiment, the spatial features are one-dimensional (1D) body measurements. In one embodiment, the spatial features are 2D body segments.

In one embodiment, the first type of augmentation data is selected from the group consisting of skin color, face contour, hair style, and virtual clothing.

In one embodiment, the first type of augmentation data is lighting conditions.

In one embodiment, the second type of augmentation data is background images representing a variety of backgrounds. In one embodiment, the method further comprises performing segmentation on the augmented 2D image to extract one or more features associated with the 3D model from the background, the segmentation utilizing a plurality of data points from the 3D model. In one embodiment, the method further comprises performing line annotation on the augmented 2D image for generating an annotation line on each spatial feature corresponding to a spatial feature measurement, the line annotation utilizing a plurality of data points from the 3D model.

In one embodiment, the method further comprises generating ground truth feature measurements from the spatial features utilizing a plurality of data points from the 3D model.

In one embodiment, the second type of augmentation data is white noise.

In one embodiment, the second type of augmentation data is perspective distortion data.

In one embodiment, the method further comprises generating a second training data set from a second 3D model to train the deep learning network for spatial feature extraction, wherein the second training data set comprises a second plurality of spatial features, a second plurality of augmented 3D models, a second plurality of 2D images, and a second plurality of augmented 2D images.

In one embodiment, the method further comprises training the deep learning network for spatial feature extraction using the second training data set.

In one embodiment, the at least one 2D image is selected from the group consisting of a front-view image of the 3D model, a side-view image of the 3D model, and an image projected from the 3D model at an angle of approximately 45 degrees with respect to the front-view image.

In one embodiment, the 3D model is a 3D body model and the method further comprises training a sizing machine-learning module, wherein the sizing machine-learning module is trained on ground truth data comprising 1D body measurements extracted from the 3D body model.

In one embodiment, the sizing machine-learning module is trained on ground truth data comprising the 1D body measurements extracted from the 3D body model and one or more user parameters associated with the 3D body model.

In one embodiment, the user parameters are selected from the group consisting of a height, a weight, a gender, an age, and a demographic information associated with the user.

In one embodiment, the sizing machine-learning module comprises a random forest algorithm.

In one embodiment, the 3D body model comprises at least one 3D body model of a fully-nude user or a partially-nude user.

In one embodiment, the deep learning network comprises a convolutional neural network (CNN).

In one embodiment, the deep learning network further comprises a pyramid pooling module.

In one embodiment, the at least one 3D model is received from a 3D scanner. In some embodiments, the 3D human body model is received from a 3D body scanner of a human body.

In one embodiment, the method further comprises training a deep learning network for body measurement determination using the training data set. In one embodiment, the method further comprises providing the trained deep learning network for measurement determination.

In one embodiment, the method further comprises post-processing the training data set before providing the training data set to train the deep learning network.

In various embodiments, a computer program product is disclosed. The computer program may be used for generating training data sets for training deep learning networks for spatial feature extraction from two-dimensional (2D) images of a three-dimensional (3D) object, and may include a computer readable storage medium having program instructions, or program code, embodied therewith, the program instructions executable by a processor to cause the processor to perform steps to the aforementioned steps.

In various embodiment, a system is described, including a memory that stores computer-executable components; a hardware processor, operably coupled to the memory, and that executes the computer-executable components stored in the memory, wherein the computer-executable components may include a components communicatively coupled with the processor that execute the aforementioned steps.

In another embodiment, the present invention is a non-transitory, computer-readable storage medium storing executable instructions, which when executed by a processor, causes the processor to perform a process for generating spatial features, the instructions causing the processor to perform the aforementioned steps.

In another embodiment, the present invention is a system for spatial feature extraction using a 2D phone camera, the system comprising a user device having a 2D camera, a processor, a display, a first memory; a server comprising a second memory and a data repository; a telecommunications-link between said user device and said server; and a plurality of computer codes embodied on said first and second memory of said user-device and said server, said plurality of computer codes which when executed causes said server and said user-device to execute a process comprising the aforementioned steps.

In yet another embodiment, the present invention is a computerized server comprising at least one processor, memory, and a plurality of computer codes embodied on said memory, said plurality of computer codes which when executed causes said processor to execute a process comprising the aforementioned steps. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIGS. 6A and 6B show example input images (front and side views, respectively) of an illustrative 3D model of a human for generating a training data set for training deep learning networks for measurement determination.

FIGS. 7A and 7B show example segmented and annotated images for an illustrative process for segmenting and annotating front view and side images, respectively, (which may be performed manually by a human operator or automatically using the underlying 3D model), for training deep learning networks for measurement determination.

FIGS. 9A and 9B show an illustrative test run on sample 2D images (front view and side views, respectively) of a sample 3D model utilizing a deep learning network (DLN) for body measurement determination after the DLN has been trained.

FIG. 9C shows results of an illustrative test run on the sample 2D images from FIGS. 9A and 9B.

DETAILED DESCRIPTION OF THE INVENTION

Overview

Figure 1:
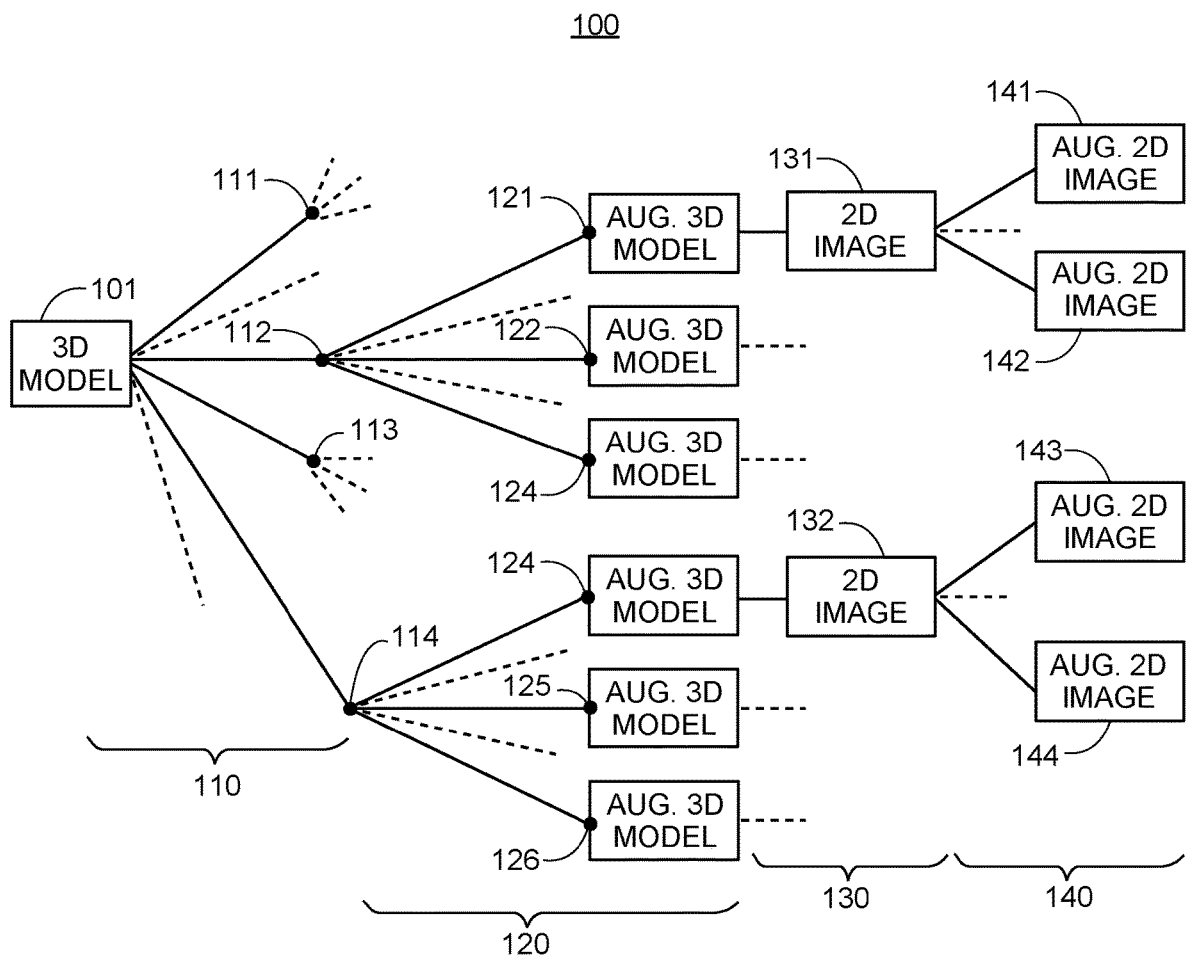
FIG. 1 shows an example tree that demonstrates stages for generating large data sets for training deep learning networks for body measurement determination, in accordance with one embodiment of the invention.

With reference to the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Others have tried many different types of approaches to generate or extract 1D measurements from 2D images of 3D objects. All of these approaches generally require the user, or an object, to have specific poses, stand at a specific distance from the camera, in front of an empty background; and for a human subject, wear tight fitting clothing, and/or go partially nude wearing. Such requirements for controlled environments and significant user friction are undesirable.

The present invention solves the aforementioned problems by providing a system and method for accurately extracting 1D measurements, such as body measurements, from 2D photos with 1) the object in any pose, 2) the object against any background type, 3) the photos taken at any distance, 4) the object having any type of covering, such as clothing on a human, and 5) the lighting is of any position, angle, color, or shadowing, such that everyone can easily take photos of real-world objects or themselves, and benefit from full measurement extraction. Some embodiments of the present invention do not involve any 3D reconstruction or 3D models, nor do they require specialized hardware cameras. Instead, advanced computer vision combined with deep-learning techniques are used to generate accurate measurements no matter how the object is placed or covered from photos provided from a simple mobile device camera. In the present disclosure, the term "2D phone camera" is used to represent any traditional cameras embedded in, or connected to, computing devices, such as smart phones, tablets, laptops, or desktops.

One difficulty with implementing deep learning networks for measurement determination from 2D photos is the vast size of training data sets required to train the deep learning networks. In one embodiment, the present invention solves these problems by providing a method, apparatus, and system for greatly magnifying the amount of training data available from smaller samples of training data. For example, in one embodiment, a few thousand 3D scans can be utilized and amplified to generate millions (or more) training data points, as described in greater detail below. In general, the present invention can be utilized to magnify by hundreds or thousands of times or more the amount of training data available to train the deep learning networks.

Generating Data Sets for Training Deep Learning Networks for Body Measurements

FIG. 1 shows an example tree 100 that demonstrates stages for generating large data sets for training deep learning networks for measurement determination, in accordance with one embodiment of the invention. First, a 3D model 101 is received. At step 110, a first type of augmentation data, comprising a plurality ($P_1$) of options, is generated, and the 3D model 101 is augmented with each option to generate a plurality ($P_1$) of a first stage of augmented 3D models 111-114. At step 120, which may be optional, another type of augmentation data, comprising a plurality ($P_2$) of options, is generated, and the plurality ($P_1$) of first stage augmented 3D models 111-114 are again augmented with each option in the plurality ($P_2$) of options to generate a plurality ($P_1*P_2$) of a second stage of augmented 3D models 121-126. At step 130, at least one 2D image is generated from each of the plurality ($P_1*P_2$) of augmented 3D models by performing projections of the 3D model to generate a plurality ($P_1*P_2$) of 2D images 131-132. At step 140, a second type of augmentation data, comprising a plurality (Q) of options, is generated, and the plurality ($P_1*P_2$) of 2D images 131-132 are augmented with each option in the plurality (Q) of options to generate a plurality ($P_1*P_2*Q$) of augmented 2D images 141-144. Thus, from a single 3D model 101, a large number ($P_1*P_2*Q$) of augmented 2D images may be generated to be included as training data to be used in training deep learning networks. Various embodiments of processes that generate the example tree 100 are further described in FIGS. 2-5.

Figure 2:
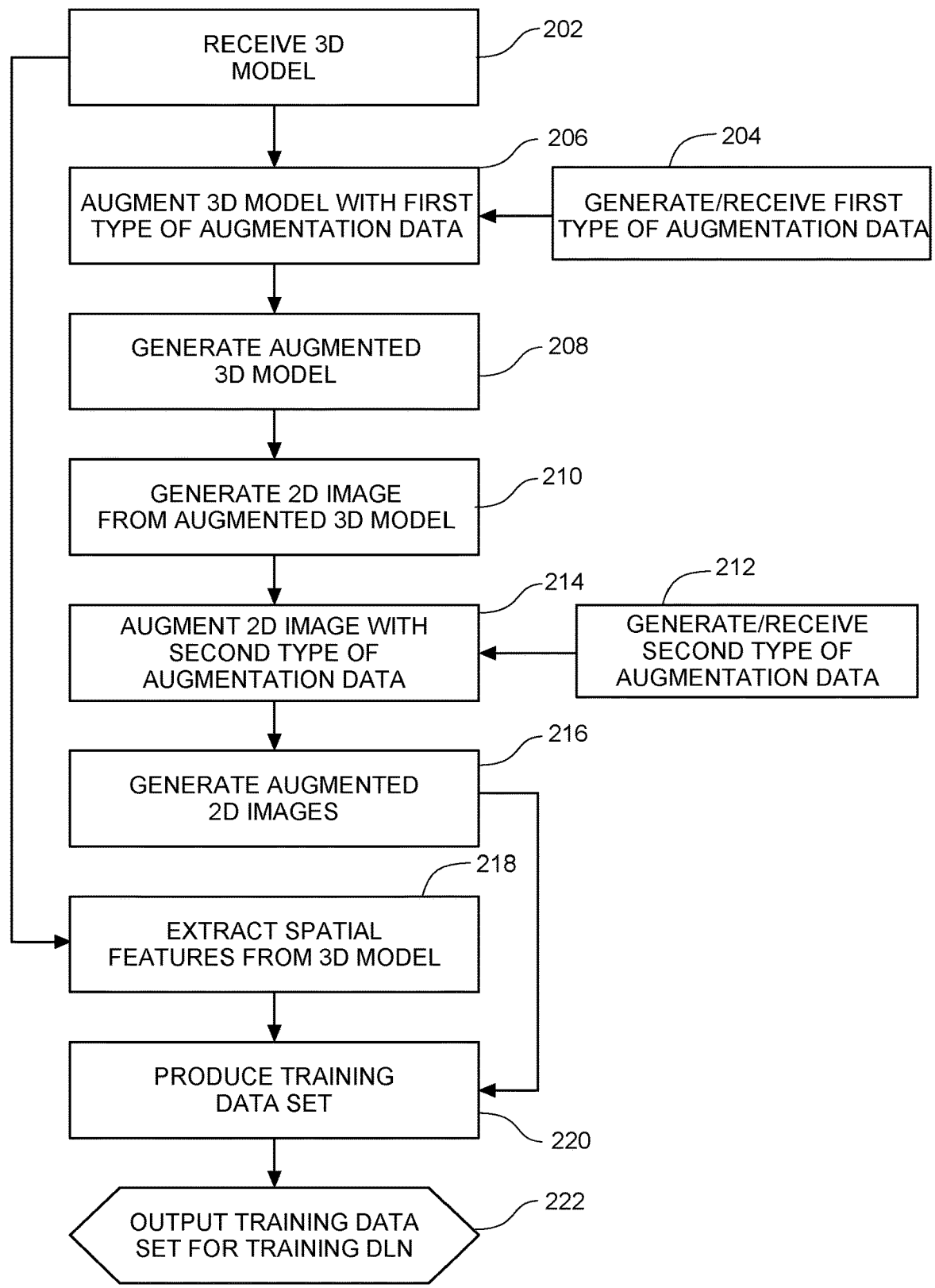
FIG. 2 shows an example flow diagram for generating massive data sets for training deep learning networks for spatial feature determination for a 3D model, in accordance with one embodiment of the invention.

FIG. 2 shows an example flow diagram 200 for generating massive data sets for training deep learning networks for spatial feature determination for a 3D model, in accordance with one embodiment of the invention. A 3D model 202 is received. The 3D model 202 may be a variety of 3D objects, such as a human body, an animal (e.g. dog, cat), furniture (e.g. sofa, table), a vehicle (e.g. automobile, motorcycle), or a musical instrument (e.g. piano), and so forth. For example, in one embodiment, a 3D human body model may be obtained from a 3D body scanner (not shown).

In the case of a 3D human body model, and according to some embodiments, 3D body scan data from the "SizeUSA" data set, which is a commercial sample of 3D body scans obtained on about 10,000 human subjects (both male and female), may be utilized as the source of the 3D models. In other embodiments, 3D body scan data from the "CAESAR" data set may be utilized, which is another commercial sample of 3D body scans obtained on about 4,000 human subjects, and also includes manually-measured ground truth data using a human tailor. In yet other embodiments, an organization utilizing the present invention may capture and/or generate their own 3D models of any 3D objects of interest.

At step 204, a first type of augmentation data, comprising a plurality ($P_1$) of options, is generated. Examples of the first type of augmentation data for 3D human body models are described in FIG. 3. At step 206, the 3D model 202 is augmented with each option to generate at step 208 a plurality ($P_1$) of a first stage of augmented 3D models 111-114.

At step 210, a plurality ($P_1$) of 2D images 131-132 is generated from the plurality ($P_1$) of the first stage of augmented 3D models. The generation may be executed by, for example, performing projections of the 3D model onto a plane (front plane or side plane) using, for example, orthographic projection. In some embodiments, both front and side images are taken.

At step 212, a second type of augmentation data, comprising a plurality (Q) of options, is generated, and at step 214, the plurality ($P_1$) of 2D images 131-132 are augmented with each option in the plurality (Q) of options to generate a plurality ($P_1*Q$) of augmented 2D images 141-144.

In some embodiments, the second type of augmentation data may be, for example, a plurality (Q) of background images. The background images represent a variety of potential backgrounds that may be observed by subjects in real environments. The background images should be representative of various lighting, shading, locality, and other background conditions that are typical of subjects taking spatial features, such as body measurements. A variety of backgrounds should be selected to optimize the training of the deep learning networks, in particular the segmentation deep learning network, at body segmentation, as described below. A background image from the plurality (Q) of background images received at step 212 is added to the front and side images from step 210 to generate $2*P_2$ images with a given background. At step 214, this process is repeated for the plurality (Q) of background images, that is, Q times, to generate a total of $2*P_1*Q$ images.

In some embodiments, the second type of augmentation data may be, for example, white noise or other types of random noise. This may be useful in rendering the deep learning network more robust to imperfect image capturing and other environmental conditions. In other embodiments, the second type of augmentation data may be, for example, perspective distortion data.

At step 218, spatial features are extracted from the 3D model to serve as "ground truth" data for training the annotation deep learning network and machine learning modules described below. In some embodiments, the spatial features are 1D measurements and corresponding annotation lines, such as shirt size, hat size, waist size, or chest size of a human body model. The 1D measurement may be extracted from the 3D model by performing a virtual measurement of the corresponding desired measurement along any given "virtual" annotation line in the 3D model, analogously to how a human tailor would measure a real 3D human body.

By combining the $2*P_1*Q$ images from step 216 with the 1D measurements ("ground truth data") from step 218, it is possible to generate a plurality ($2*P_1*Q$) of training data for training the deep learning networks from just one 3D model, as shown in step 220. Finally, in step 222, the training data set is ready for use in training deep learning networks.

Figure 3:
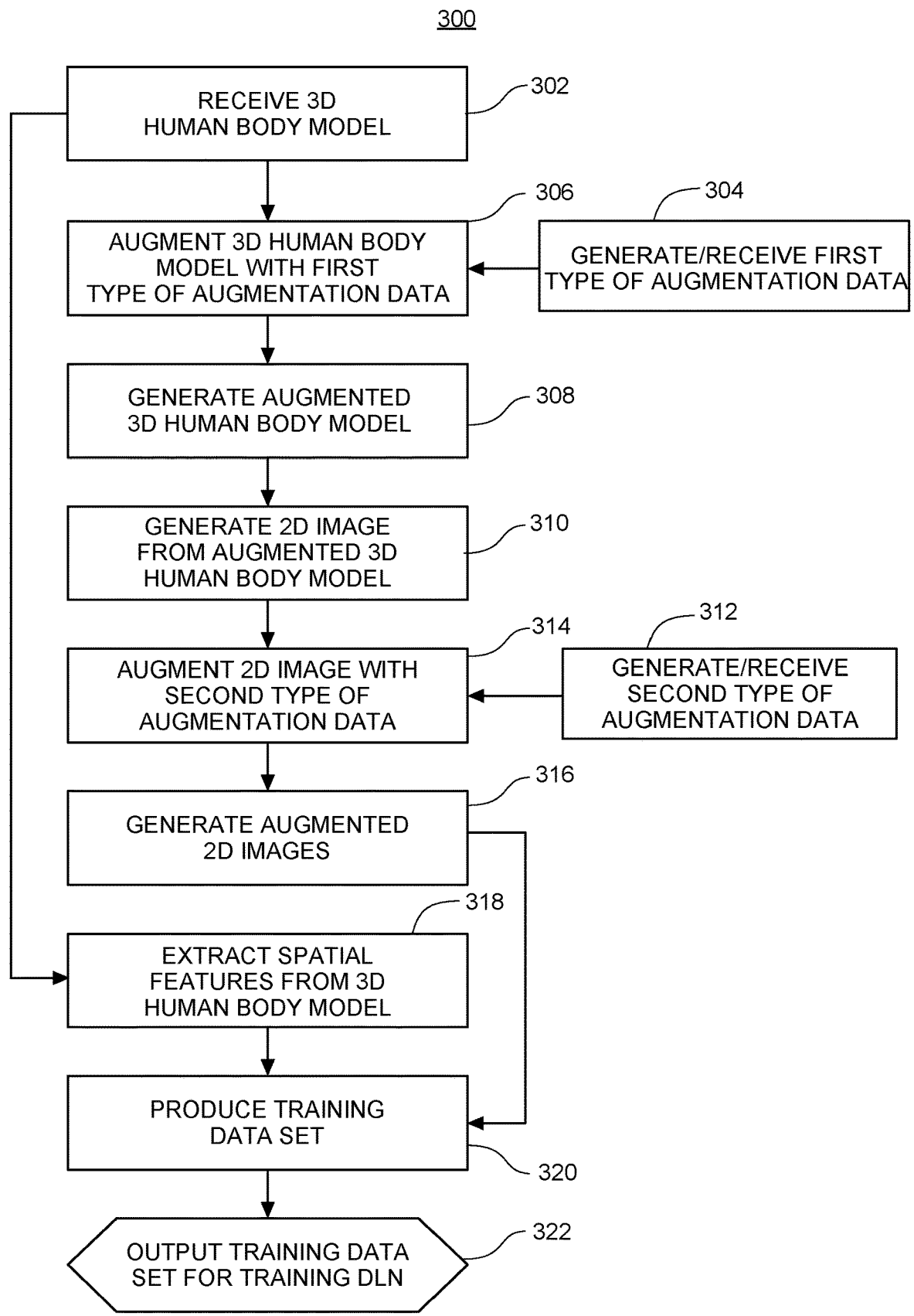
FIG. 3 shows an example flow diagram for generating massive data sets for training deep learning networks for spatial feature determination for a 3D human model, in accordance with one embodiment of the invention.

FIG. 3 shows an example flow diagram 300 for generating massive data sets for training deep learning networks for spatial feature determination for a 3D model, in accordance with one embodiment of the invention. The steps are generally more specific embodiments of the steps in FIG. 2, e.g. 302 corresponds to 202, 304 corresponds to 204, 306 corresponds to 206, 308 corresponds to 208, 310 corresponds to 210, 312 corresponds to 212, 314 corresponds to 214, 316 corresponds to 216, 318 corresponds to 218, 320 corresponds to 220, and 322 corresponds to 222.

Examples of the first type of augmentation data for 3D human body models include skin colors, face contours, hair styles and colors, virtual clothing, and lighting conditions. In one embodiment, at step 304, a plurality (U) of skin colors is generated, representing a variety of potential skin colors a subject might have. These skins colors may cover the range of skin colors naturally present in human subjects, as well as colors produced by other means, such as tanning or tattooing. At step 306, the plurality (U) of skin colors generated in step 304 is added to the 3D body model 302 to generate a plurality (U) of augmented 3D human body models that include various skin colors at step 308.

In another embodiment, at step 304, a plurality (V) of face contours is generated, representing a variety of potential face contours a subject might have. Such face contours may include, for example, the shapes of the eyes, nose, cheeks, chin, jawline, mouth, and forehead. The face contours are also independent of the body shape of the 3D body model 302. At step 306, the plurality (V) of face contours generated in step 304 is added to the 3D body model 302 to generate a plurality (V) of augmented 3D human body models that include various face contours at step 308.

In another embodiment, at step 304, a plurality (W) of hair styles and colors is generated, representing a variety of hair styles and colors a subject might have. Such hair styles may include hair of various lengths, hair of various levels of straightness or curliness, various haircuts, and hairlines at various stages of baldness. Such hair colors may include those naturally present in human subjects (e.g. white, blond, red, brown, black), as well as colors generated by other means, such as dyeing (e.g. pink, blue, green, violet). At step 306, the plurality (W) of hair styles and colors generated in step 304 is added to the 3D body model 302 to generate a plurality (W) of augmented 3D human body models that include various hair styles and colors at step 308.

In another embodiment, at step 304, a plurality (X) of virtual clothing is generated, representing a variety of fits of potential clothing a subject might wear, including but not limited to tight fit, regular fit, loose fit, etc. At step 306, the plurality (X) of virtual clothing generated in step 304 is added to the 3D body model 302 to generate a plurality (X) of augmented 3D human body models that include various virtual clothing at step 308.

In another embodiment, at step 304, a plurality (Y) of lighting is generated, representing a variety of positions, angles, colors, and shadowing a subject might be under, including but not limited to natural sun light, room light, moonlight, camera flash light, street lights, etc. At step 306, the plurality (Y) of lighting generated in step 304 is added to the 3D body model 302 to generate a plurality (X) of augmented 3D human body models that include various lighting at step 308.

In some embodiments, the augmentation of skin colors, face contours, hair styles, and lighting is performed using image inpainting techniques. For example, a PyTorch implementation of a partial convolution layer is described at https://github.com/NVIDIA/partialconv. In some embodiments, skin color augmentation may be performed by adjusting the face rendering RGB curve based on skin color statistics. The statistics may follow various distributions, including, for example, a uniform distribution or a Gaussian distribution.

By combining the $2*P_1*Q$ images (where $P_1$ is either U, V, W, X, or Y) from step 316 with the 1D measurements ("ground truth data") from step 318, it is possible to generate a plurality $(2*P_1*Q)$ of training data for training the deep learning networks from just one 3D body model, as shown in step 320. Finally, in step 322, the training data set is ready for use in training deep learning networks.

Figure 4:
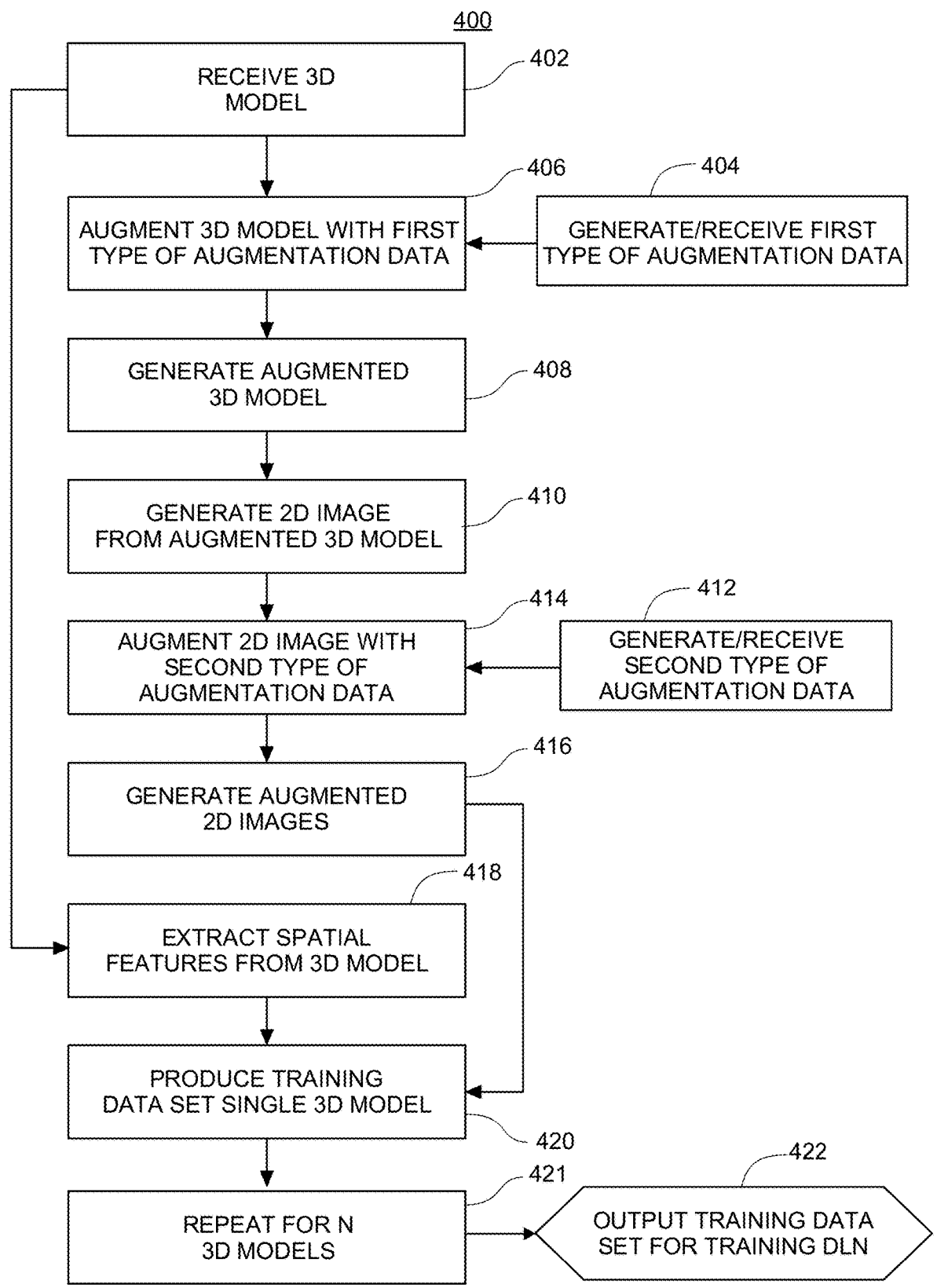
FIG. 4 shows an example flow diagram for generating massive data sets for training deep learning networks for spatial feature determination for multiple 3D models, in accordance with one embodiment of the invention.

FIG. 4 shows an example flow diagram 400 for generating massive data sets for training deep learning networks for spatial feature determination for multiple 3D models, in accordance with one embodiment of the invention. Flow diagram 400 represents a repetition, or loop, of flow diagram 200 in FIG. 2 for a plurality (N) of 3D models. Thus, the following steps correspond to each other: 402 corresponds to 202, 404 corresponds to 204, 406 corresponds to 206, 408 corresponds to 208, 410 corresponds to 210, 412 corresponds to 212, 414 corresponds to 214, 416 corresponds to 216, 418 corresponds to 218, 420 corresponds to 220, and 422 corresponds to 222.

At step 421, the production of a training data set for a single 3D model as completed in step 420 is repeated a plurality of times (N times) for a plurality (N) of 3D models. This results in $P_1*Q*N$ ($2*P_1*Q*N$ if two images are generated from each augmented 3D model) training data from just N 3D models, as shown in output element 422. The training data 422 may then be used in training the deep learning networks as described in relation to FIGS. 8A & 8B below.

Figure 5:
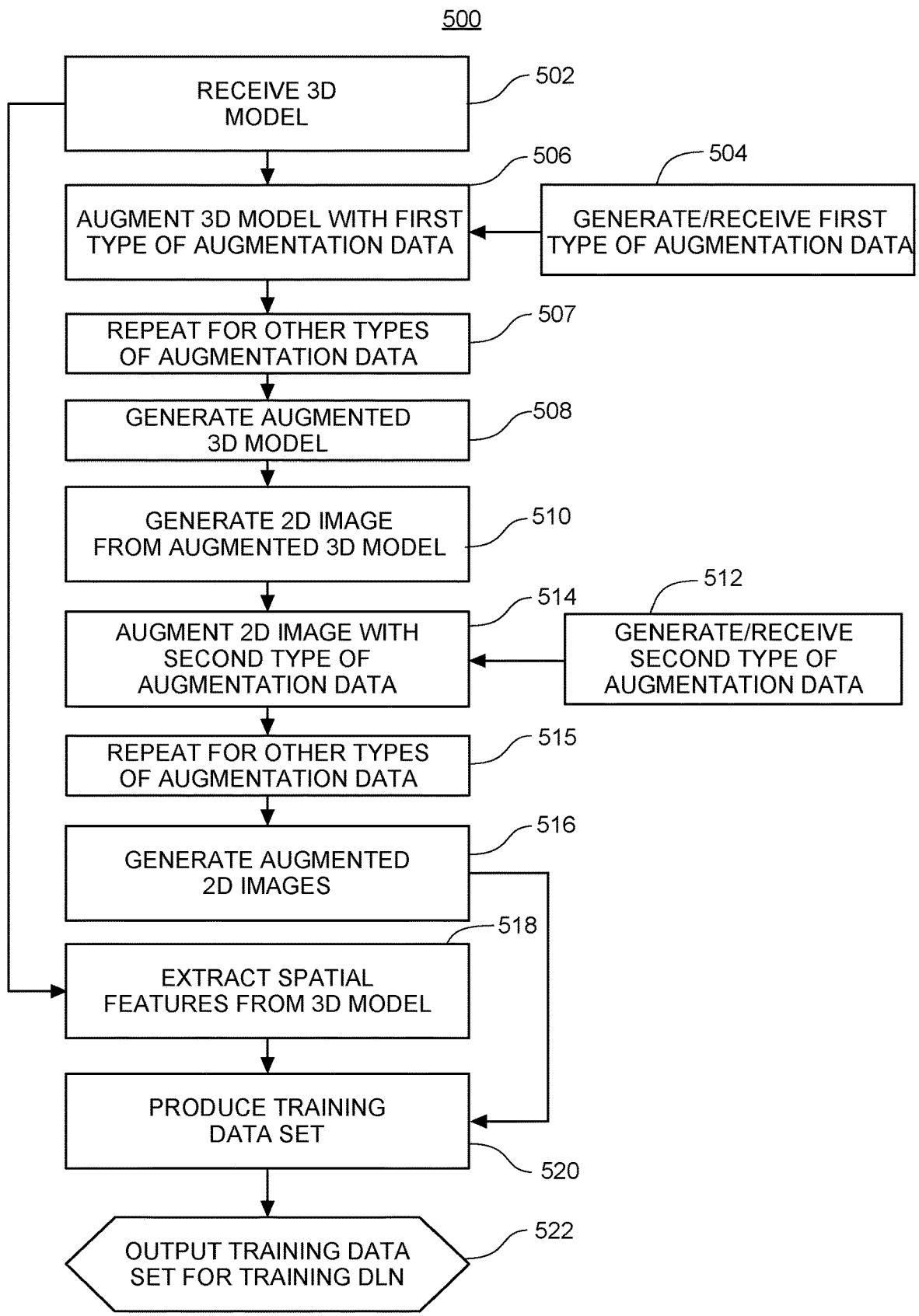
FIG. 5 shows an example flow diagram for generating massive data sets for training deep learning networks for spatial feature determination for a 3D model by augmenting the 3D model with multiple types of augmentation data, in accordance with one embodiment of the invention.

FIG. 5 shows an example flow diagram 500 for generating massive data sets for training deep learning networks for spatial feature determination for a 3D model by augmenting the 3D model with multiple types of augmentation data, in accordance with one embodiment of the invention. Flow diagram 500 is similar to flow diagram 200 in FIG. 2, but with augmentation steps repeated, or looped, as discussed below. Thus, the following steps correspond to each other: 502 corresponds to 202, 504 corresponds to 204, 506 corresponds to 206, 508 corresponds to 208, 510 corresponds to 210, 512 corresponds to 212, 514 corresponds to 214, 516 corresponds to 216, 518 corresponds to 218, 520 corresponds to 220, and 522 corresponds to 222.

At step 504, a first type of augmentation data, comprising a plurality $(P_1)$ of options, is generated. At step 506, the 3D model 502 is augmented with each option to generate a plurality $(P_1)$ of a first stage of augmented 3D models 111-114. At step 507, steps 504 & 506 are repeated for another type of augmentation data, comprising a plurality $(P_2)$ of options, and the plurality $(P_1)$ of first stage augmented 3D models 111-114 are again augmented with each option in the plurality $(P_2)$ of options to generate a plurality $(P_1*P_2)$ of a second stage of augmented 3D models 121-126 at step 508. Step 507 may be repeated any finite number of times (M) to generate a plurality $(P_1*P_2*P_3* \ldots *P_M)$ of augmented 3D models. For example, executing steps 504-507 on a 3D human body model with a plurality (U) of skin colors, a plurality (V) of face contours, a plurality (W) of hair styles, a plurality (X) of types of virtual clothing, and a plurality (Y) of lighting conditions (M=5) generates a plurality $(U*V*W*X*Y)$ of augmented 3D body models with various combinations of those features.

At step 514, a second type of augmentation data, comprising a plurality $(Q_1)$ of options, is generated, and the plurality $(P_1*P_2*P_3* \ldots *P_M)$ of 2D images 131-132 are augmented with each option in the plurality $(Q_1)$ of options to generate a plurality $(P_1*P_2*P_3* \ldots *P_M*Q_1)$ of augmented 2D images 141-144. At step 515, steps 512 & 514 are repeated for another type of augmentation data, comprising a plurality $(Q_2)$ of options, and the plurality $(Q_1)$ of first stage augmented 2D images are again augmented with each option in the plurality $(Q_2)$ of options to generate a plurality $(Q_1*Q_2)$ of a second stage of augmented 2D images at step 516. Step 515 may be repeated any finite number of times (L) to generate a plurality $(P_1*P_2*P_3* \ldots *P_M*Q_1*Q_2*Q_3* \ldots *Q_L)$ of augmented 2D images. For example, executing steps 512-515 on a plurality $(P_1*P_2*P_3* \ldots *P_M)$ of 2D images with a plurality $(Q_1)$ of background images, a plurality $(Q_2)$ of noise conditions, and a plurality $(Q_3)$ of perspective distortion data conditions (L=3) generates a plurality $(P_1*P_2*P_3* \ldots *P_M*Q_1*Q_2*Q_3)$ of augmented 2D images with various combinations of those features.

Note that the processes disclosed in FIGS. 2-5 may be combined. For example, the repetition for a plurality (N) of 3D models in step 421 in flow diagram 400 may be combined with the repetition of step 507 (M times) for the first type of augmentation data and the repetition of step 515 (L times) for the second type of augmentation data. Other combinations are also within the scope of the present invention.

In one embodiment, not shown in FIGS. 2-5, one or more user parameters associated with each subject corresponding to each 3D model may be received. For 3D human body models, the one or more user parameters may comprise a height, a weight, a gender, an age, and/or additional demographic information associated with each subject of each 3D human body model, and any subsets thereof. For example, in one embodiment, the user parameter is the height of the user; while in another embodiment, the user parameters are the height and the weight of the user. In one embodiment, these user parameters may be used to train the sizing machine learning module on these additional use parameters associated with each subject. In one embodiment, the sizing machine-learning module is trained on ground truth data comprising the 1D body measurements extracted from the 3D human body model and one or more user parameters associated with the 3D human body model.

Illustrative Generation of Training Data for Deep Learning Networks

In order to understand the benefits of the present invention, it is useful to compare the processes described in FIGS. 2-5 for generating training data sets to a typical process used to generate segmented and annotated front and side images for training the deep learning networks. In that regard, FIGS. 6A & 7A show an illustrative annotation process for annotating a front view photo of a subject for training deep learning networks for body measurement determination, while FIGS. 6B & 7B show an illustrative annotation process for annotating a side view photo of a subject for training deep learning networks for body measurement determination, where FIGS. 6A & 6B are the input images for the process (before annotation) and FIGS. 7A & 7B are the output images for the process (after annotation). Although a specific user pose, the "A-pose," is shown in FIGS. 6A, 6B, 7A & 7B, it will be understood to one of ordinary art that any pose, such as the A-pose, hands on the side, or any other pose is within the scope of the present invention. An optimal pose would clearly show legs and arms separated from the body. One advantage of the present invention is that a human can stand in almost any reasonable pose, against any type of background. The human does not need to stand against a blank background or make special arrangements for where the photos are taken.

FIGS. 6A, 6B, 7A & 7B show illustrative diagrams 610, 620, 710 & 720 of an annotator, or operator, manually segmenting one or more features of the human body under the clothing from the background for training the segmentation DLN. In FIGS. 6A, 6B, 7A & 7B, the annotator is manually annotating the body under the clothing. Humans have lots of experience of seeing other humans and estimating their body shapes under the clothing, and this data is used for training the segmentation DLN to perform a similar operation automatically on new photos of unknown humans.

FIGS. 7A & 7B show illustrative diagrams of the body features of the human body segmented from the background after all body features have been successfully annotated by the annotator. In the illustrative diagrams 710 & 720, dashed lines represent the segmentation of body parts, and solid lines represent annotation lines for body part measurements. In other embodiments, other distinctive markings may be used to denote the two types of segmentations and annotations. The annotation has identified, for example, the bottom of the neck or top of the torso 711 & 721, the bottom of the upper arm 712 & 722, the waist 713 & 723, and the top of the ankle 714 & 724.

Furthermore, the height of the user may be annotated as well. In illustrative diagrams 710 & 720, the top and bottom of the user are marked by small circles just above the user's head and between the user's feet, respectively. This height information may be used, for example, for correctly scaling the 2D image for scaling the other measurements from pixels to real-world units (e.g., cm). This data is used to train the human segmentation DLN.

The processes described in relation to FIGS. 2-5 can be used to automate the highly tedious process of manually generating segmentation and annotation data as described in FIGS. 7A & 7B. Instead of the human annotator having to manually segment the body under the clothing from the background, and manually add annotation lines corresponding to the measurement lines, the processes of FIGS. 2-5 can be used to automatically generate segmentation and annotation data from the 3D model. The 3D model already contains the data corresponding to the outline of the human under the virtual clothing, as well as the data corresponding to the annotations of the measurement lines. This data is implicitly stored in the 3D model and can be extracted from the 3D model and used to generate massive amounts of training data as described in relation to FIGS. 2-5 above.

In addition, because the corresponding 1D measurements have also been extracted from the 3D model, this data can also be used as "ground truth" data corresponding to actual human body measurements, which can be used to train the sizing machine learning module described below as well.

Therefore, using the principles taught in the present disclosure, it is possible to avoid both manual segmentation of the body under the clothing, as well as avoid manual annotation of the measurement lines on the body. Furthermore, the present invention obviates the need to obtain "ground truth" data from actual human tailors. Together, the present invention saves much labor and many manual steps are eliminated from the process of collecting and generating useful training data sets for training the deep learning networks. In addition, the principles taught in the present disclosure enable the vast magnification, or increase, in the quantity of training data. From just a relatively small set of 3D models, vast amounts of useful training data may be quickly and efficiently generated, without the need for front and side photographs or actual tailors to measure sample subjects.

Although only front and side views are shown in FIGS. 6A, 6B, 7A & 7B, one of ordinary skill in the art would recognize that any other orientations of views, including 45-degree views, top views, and so on, are within the scope of the present invention, depending on the type of body measurement desired. For example, a top photo of the top of a human head would be optimal for head measurements used to manufacture custom hats. Similarly, a front face only photo would be optimal for facial measurements used for sizing glasses, optical instruments, and so forth. A close-up photo of the front and back of a human hand can be used for sizing custom gloves, custom PPE (personal protective equipment) for the hands, custom nails, and so forth.

Training the Deep Learning Networks from Generated Data Sets

A starting point for any machine learning method such as used by deep learning networks is a documented dataset containing multiple instances of system inputs and correct outcomes (e.g., the training data). This data set can be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. The quality of the output of the machine learning system output depends on (a) the pattern parameterization, (b) the learning machine design, and (c) the quality of the training database. These components can be refined and optimized using various methods. For example, the database can be refined by adding datasets for new documented subjects. The quality of the database can be improved, for example, by populating the database with cases in which the customization was accomplished by one or more experts. Thus, the database will better represent the expert's knowledge. In one embodiment, the database includes data for examples of matches, which can assist in the evaluation of a trained system.

Accordingly, generating training data from 3D models taken from a variety of sources in order to train the deep learning networks as described in this disclosure would greatly advance the state of the art in deep learning network training. The following description describes how the generated datasets are used to train the deep learning networks after the massive training data sets have been generated as described above.

Figure 8A:
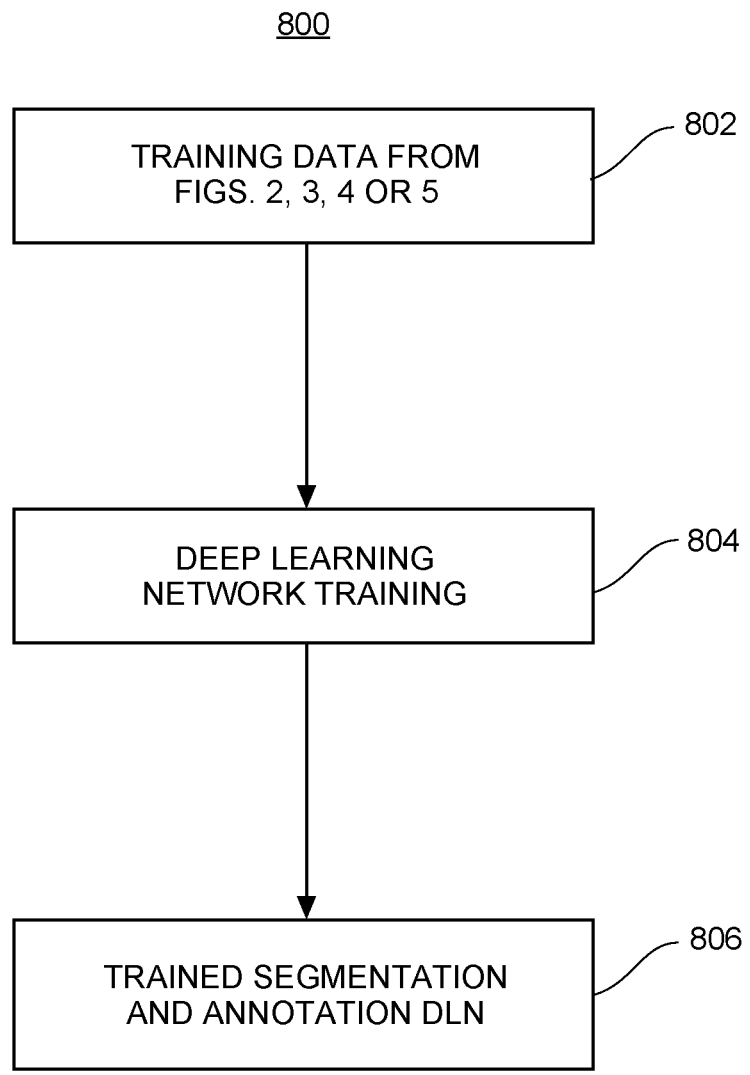
FIG. 8A shows an example flow diagram for training deep learning networks for measurement determination, in accordance with one embodiment of the invention.

FIG. 8A shows an example flow diagram 800 for training deep learning networks for measurement determination, in accordance with one embodiment of the invention. Consider the generalized case for a plurality (N) of 3D models, a plurality (M) of categories of the first type of augmentation, a plurality (L) of categories of the second type of augmentation, and two images (front and side) are taken for each augmented 3D model. At step 802, the plurality $(2*P_1*P_2*P_3* \ldots *P_M*Q_1*Q_2*Q_3* \ldots *Q_L*N)$ of training data is generated as described in relation to FIGS. 2-5. At step 804, the plurality $(2*P_1*P_2*P_3* \ldots *P_M*Q_1*Q_2*Q_3* \ldots *Q_L*N)$ of training data is used to train the deep learning networks for both segmentation and annotation, as well as to train the machine learning module for measurement extraction as described in greater detail below. Finally, at step 806, the trained segmentation DLN, annotation DLN, and machine learning modules are output and utilized for body measurement determination as described in greater detail below.

In short, as a result of utilizing the processes described in FIGS. 2-5, a large increase in training data $(2*P_1*P_2*P_3* \ldots *P_M*Q_1*Q_2*Q_3* \ldots *Q_L*N)$ is generated from just a small number (N) of 3D models. For even modest $P_1$, $P_2$, $P_3$, ..., $P_M$, $Q_1$, $Q_2$, $Q_3$ ..., $Q_L$, and N, a very large training data set may be generated from a small number (N) of 3D models. For example, generating just 2 ($P_1$) different skin colors, 2 ($P_2$) different face contours, 2 ($P_3$) different hair styles, 10 ($P_4$) different types of virtual clothing, 2 ($P_5$) different lighting conditions, 2 images for each augmented 3D model (front and side), 100 ($Q^1$) different backgrounds, and 2 ($Q_2$) different noise profiles, using the principles taught in FIGS. 2-5, it is possible to generate 640,000,000 training data points from just 10,000 3D models (2*2*2*2*10*2*100*2*10,000), which is a factor of 64,000, or about 4.5 orders of magnitude increase in the size of the training data set.

Figure 8B:
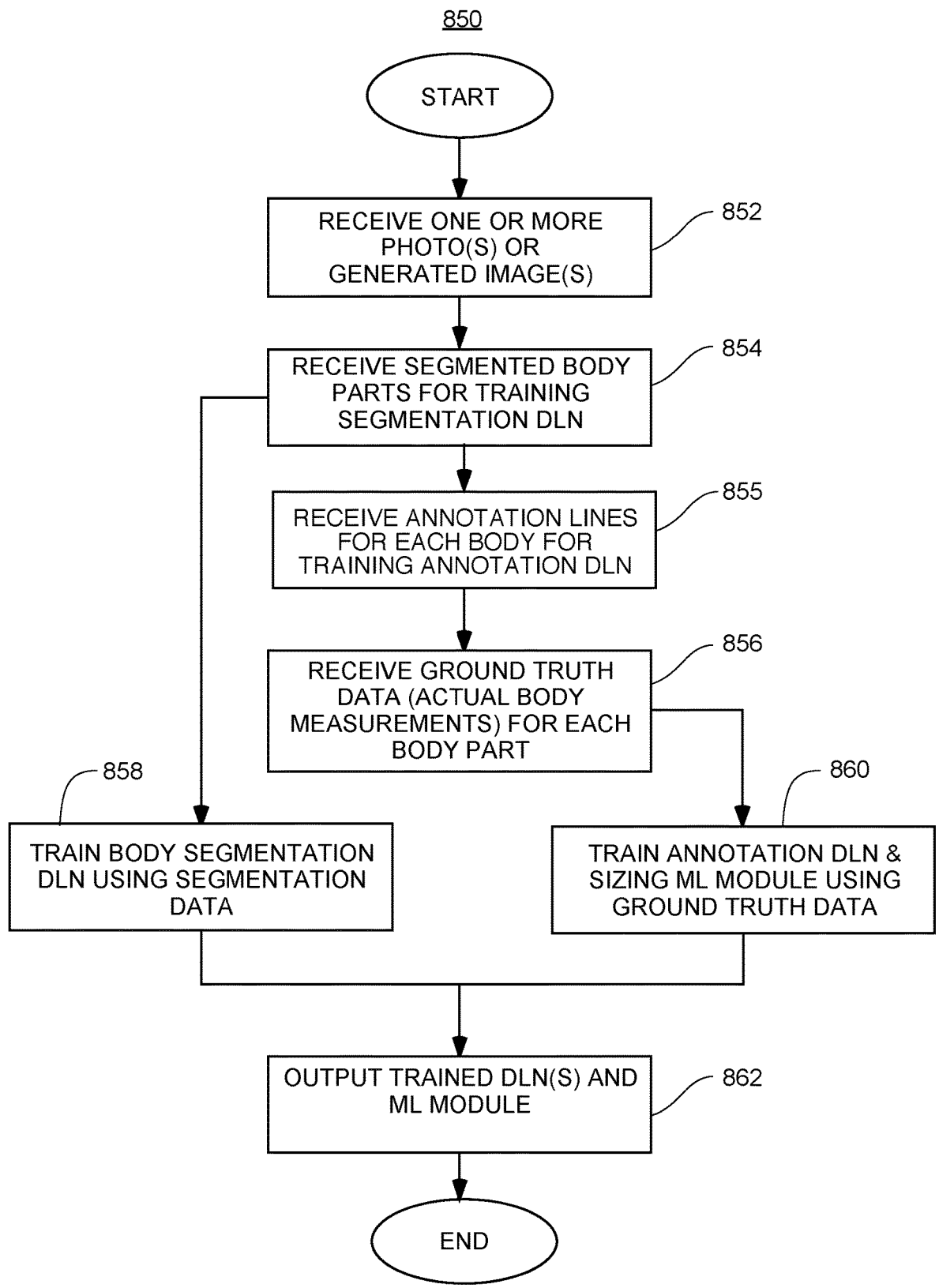
FIG. 8B shows another detailed example flow diagram for training deep learning networks for body measurement determination, in accordance with one embodiment of the invention.

FIG. 8B shows another detailed example flow diagram 850 for training deep learning networks for body measurement determination, in accordance with one embodiment of the invention. FIG. 8B shows a diagram 850 of an exemplary flow diagram for training the segmentation DLN, the annotation DLN, and the sizing ML, which are utilized in generating body measurements, in accordance with example embodiments of the present invention. At step 852, one or more photos or generated augmented 2D images are received. In one embodiment, and as described above, the front and side view augmented 2D images are generated from a 3D model, and the system utilizes the generated or "virtual" front and side view images throughout the rest of the process described in FIG. 8B.

In another embodiment, the photos may be obtained from a user device (e.g., mobile phone, laptop, tablet, etc.). In another embodiment, the photos may be obtained from a database (e.g., a social media database). In another embodiment, the photos from the user include a photo showing a front view and a photo showing a side view of the entire body of the user. As noted, in one embodiment, the images may be taken at a specified distance (e.g., approximately 10 feet away from the camera of a user's device). In one embodiment, the images may be taken with the user having a specific pose (e.g., arms in a predetermined position, legs spread at a shoulder length, back straight, "A-pose," etc.). In another embodiment, multiple images of a given position (e.g., front and side view photos) may be taken and an average image may be determined for each position. This may be performed to increase accuracy. In another embodiment, the user may be positioned against a background of a specific type (e.g., a neutral color, or having a predetermined background image). In another embodiment, the front and side view photos may be taken under similar lighting conditions (e.g., a given brightness, shadow, and the like). In another embodiment, the front and side view photos may include images of the user wearing normally fitted clothing (e.g., not extra loose or extra tight). Alternatively, and/or additionally, the front and side view photos may include images of the user partially clothed (e.g., shirtless), or having a different type of fit (e.g., tight, loose, etc.) depending on the needs of the AI-based algorithms and associated processes.

At step 854, segmented body parts are received for training the segmentation DLN. In one embodiment, as described above, the front and side view images are segmented using data from a 3D model, and the system utilizes the generated or "virtual" segmented images throughout the rest of the process described in FIG. 8B.

In another embodiment, an annotator may manually segment body features, such as body parts, under the clothing using human intuition. In particular, body segmentation may be performed by a human to extract a human body, excluding clothing, from a background of the photos. For example, the human annotator may be used to visually edit (e.g., trace out and color code) photos and indicate which body parts correspond to which portions of the photos to extract the human body, excluding clothing, from the background. In one embodiment, the photos may include humans posing in different environments in different clothing, with hands at 45 degrees ("A-pose"). The body outlines may be drawn on any suitable software platform, and may use a peripheral device (e.g., a smart pen) for ease of annotation. In another embodiment, printouts of the images may be used and manually segmented with pens/pencils, and the segmented printouts may be scanned and recognized by the system using one or more AI-algorithms (e.g., computer-vision based algorithms).

At step 855, annotation lines for each body part are received for training the annotation DLN. In one embodiment, as described above, the front and side view images are annotated using data from a 3D model, and the system utilizes the generated or "virtual" annotated front and side view images throughout the rest of the process described in FIG. 8B.

In another embodiment, a human annotator may draw estimated annotation (measurement) lines for each body feature under the clothing using human intuition. As noted, accurate annotation lines may be drawn by human annotators manually. The annotation lines may be drawn on any suitable software platform, and may use a peripheral device (e.g., a smart pen) for ease of annotation. In another embodiment, printouts of the images may be used and manually annotated with pens/pencils, and the annotated printouts may be scanned and recognized by the system using one or more AI-algorithms (e.g., computer-vision based algorithms).

At step 856, actual human measurements for each body feature may be received to serve as ground-truth data. In one embodiment, the actual human measurements are determined from 1D measurements taken from the 3D body models, as described above. In another embodiment, the actual human measurements are determined from measurements collected by a human tailor. The actual human measurements may be used as "ground truth" data and used for training the machine learning module used by the system. For example, the actual human measurements may be used in minimizing an error function or loss function (mean squared error, likelihood loss, log-loss, hinge loss, etc.) associated with the machine learning module described below.

In one embodiment, the human measurements may be received from a user input (e.g., an input to a user device such as a smartphone). In another embodiment, the human measurements may be received from a network (e.g., the Internet), for example, through a website. For example, a tailor may upload one or more measurements to a website and the system may receive the measurements. As noted, in another embodiment, the actual measurements may be used to train and/or improve the accuracy of the AI-based algorithmic results (e.g., deep learning models) results, to be discussed below.

At step 858, the segmentation DLN may be trained on a body segmentation or body feature extraction. In one embodiment, the segmentation DLN may be trained using human body segmentation obtained in step 854. For example, the segmentation DLN may be presented with labeled data (e.g., an image of a user and associated actual body segmentations) and may determine an error function (e.g., from a loss function, as discussed above) based on the results of the segmentation DLN and the actual body segmentation. The segmentation DLN may be trained to reduce the magnitude of the error function.

In another embodiment, the segmentation DLN may be validated by accuracy estimation techniques like a holdout method, which may split the data (e.g., all images including images having corresponding segmentations, and images on which to extract segmentations using the segmentation DLN and having no corresponding segmentations) in a training and test set (conventionally ⅔ training set and ⅓ test set designation) and may evaluate the performance of the segmentation DLN model on the test set. In another embodiment, a N-fold-cross-validation method may be used, where the method randomly splits the data into k subsets where k−1 instances of the data are used to train the segmentation DLN model while the kth instance is used to test the predictive ability of the segmentation DLN model. In addition to the holdout and cross-validation methods, a bootstrap method may be used, which samples n instances with replacement from the dataset, can be used to assess the segmentation DLN model accuracy.

At step 860, one or more annotation DLNs for each body feature may be trained, or alternatively a single annotation DLN for the entire body may be trained. For example, sixteen annotation DLNs, one for each of 16 different body parts, may be trained. In one embodiment, the annotation DLN may be trained using the annotations obtained in step 856. For example, the annotation DLN may be presented with labeled data (e.g., an image of a user with line annotations) and may determine an error function (e.g., from a loss function, as discussed above) based on the results of the annotation DLN and the actual annotations. The annotation DLN may be trained to reduce the magnitude of the error function.

In another embodiment, an annotation DLN may be trained specifically to draw annotation lines from a particular body feature, for example, a specific body part, such as an arm, a leg, a neck, and so on. In another embodiment, the training of the annotation DLN for each body feature may be performed in series (e.g., in a hierarchical manner, with groups of related body features being trained one after the other) or in parallel. In another embodiment, different training data sets may be used for different annotation DLNs, the different annotation DLNs corresponding to different body features or body parts. In one embodiment, there may be more or less than sixteen DLNs for the sixteen body parts, for example, depending on computational resources. In another embodiment, the training of the annotation DLNs may be performed at least partially in the cloud, to be described below.

Optionally, at step 860, one or more sizing ML modules for each body feature may be trained, or alternatively a single sizing ML module for the entire body may be trained. In one embodiment, the sizing ML module may be trained using the measurements obtained in step 856. For example, the sizing ML module may be presented with labeled data (e.g., an annotation line length and associated actual measurement data) and may determine an error function (e.g., from a loss function, as discussed above) based on the results of the sizing ML module and the actual measurements. The sizing ML module may be trained to reduce the magnitude of the error function.

In another embodiment, a sizing ML module may be trained specifically to extract measurements from a particular body feature, for example, a specific body part, such as an arm, a leg, a neck, and so on. In another embodiment, the training of the sizing ML module for each body feature may be performed in series (e.g., in a hierarchical manner, with groups of related body features being trained one after the other) or in parallel. In another embodiment, different training data sets may be used for different sizing ML modules, the sizing ML modules corresponding to different body features or body parts. In one embodiment, there may be more or less than sixteen sizing ML modules for the sixteen body parts, for example, depending on computational resources. In another embodiment, the training of the sizing ML modules may be performed at least partially in the cloud, to be described below.

At step 862, the trained segmentation DLN, annotation DLN, and, optionally, sizing ML module may be output for use in body measurement determination. In particular, the segmentation DLN trained in step 858 is output for use in body feature segmentation. Similarly, the one or more annotation DLNs trained in step 860 are output for body feature annotation. Finally, optionally, the sizing ML module trained in step 860 is output for body feature measurement determination.

Evaluation of the Trained Deep Learning Network

FIGS. 9A and 9B show an illustrative test run on sample 2D images (front view and side views, respectively) of a sample 3D model utilizing a deep learning network (DLN) for body measurement determination after the DLN has been trained. As discussed above, FIGS. 6A & 6B are the input images for an illustrative annotation process for annotating a front view photo and a side view photo of a subject for training deep learning networks for body measurement determination. Consider the same FIGS. 6A & 6B as the input images for an illustrative test run on sample 2D images for body measurement determination. As discussed above, although a specific user pose, the "A-pose," is shown in FIGS. 6A, 6B, 9A & 9B, it will be understood to one of ordinary art that any pose, such as the A-pose, hands on the side, or any other pose is within the scope of the present invention. An optimal pose would clearly show legs and arms separated from the body.

After the test run has completed, the DLN outputs illustrative diagrams 930 & 940 that show front and side sides, respectively, of the sample 3D model with annotation marks associated with body measurement determination. In illustrative diagrams 930 & 940, several such annotation marks are shown, such as the width of the neck 931 & 941, the edge of the arm 932 & 942, the edge of the wrist 933 & 943, the edge of the torso 934 & 944, the top of the inseam 935 & 945, and the top of the ankle 936 & 946, all determined underneath the clothing.

Similar to illustrative diagrams 710 & 720, the height of the user is annotated as well. In illustrative diagrams 930 & 940, the top and bottom of the user are marked by small circles just above the user's head and between the user's feet, respectively. This height information may be used, for example, for correctly scaling the 2D image for scaling the other measurements from pixels to real-world units (e.g., cm).

FIG. 9C shows results of an illustrative test run on the sample 2D images from FIGS. 9A and 9B. The results are displayed as an exemplary table 950, where a first column indicates identified body parts on the 3D model and a second column indicates sizing results determined for those body parts. The body parts may include, for example, the neck (circumference), shoulder (width), sleeve (length), wrist (circumference), and waist (circumference). In exemplary table 950, the body part "neck" in cell 951 is shown in cell 952 to be of size "33.2227 [cm]." The body parts may also include measurements for clothing inferred from physical body parts, such as the pants outseam and inseam appropriate for a particular 3D model. In some embodiments, the sizing results represent the best point estimate that reduces the mean square error (MSE estimate). In some embodiments, the test run may also include confidence intervals for the sizing results (not shown). In test runs of the present invention, less than 1 cm (<1 cm) accuracy has been achieved.

Illustrative First Types of Augmentation Data

Firstly, why do we need first type of augmentation data (e.g., face augmentation)? In typical datasets, for example, typical 3D body data sets generated from 3D body models, each rendered image has many body shapes because many 3D body shape models are available. However, there are only a few face patterns, typically two or three depending on the given base-mesh. A given base-mesh is a unified mesh for wrapping 3D scanned body data. Therefore, in the virtual deep learning dataset generation, we need skin, face, hair and other first types of augmentations. These are discussed in turn.

Skin Augmentation

For skin augmentation, various implementations are possible according to the present invention. In one embodiment, the current generation system has skin color augmentation. Skin augmentation is implemented in one embodiment with a skin augmentation shader code, as described in greater detail below. A shader is a shading program for 3D graphics programs, and the shader has a random RGB curve which can be used to change the skin color from black to white, as well as the colors in between. The skin augmentation is done programmatically during the rendering of the 3D model. In one embodiment, the script changes the shader's RGB curve based on skin color statistics, for example, using a uniform, Gaussian, or other distribution.

For example, the script shown in Table 1 can be used to generate skin color augmentation using a uniform distribution.

TABLE 1

Skin Color Augmentation Sample skin_white_level = random.random( ) * 0.4
bpy.data.materials['evahead'].node_tree.nodes['RGB Curves.001'].mapping
bpy.data.materials['evahead'].node_tree.nodes['RGB
Curves.001'].mapping.curves[3].points[1].location = (0.77 - skin_white level, 0.23 + skin_white_level)
bpy.data.materials['evahead'].node_tree.nodes['RGB Curves.001'].mapping.update( )
bpy.data.materials['evabody'].node_tree.nodes['RGB Curves.001'].mapping
bpy.data.materials['evabody'].node_tree.nodes['RGB
Curves.001'].mapping.curves[3].points[1].location = (0.77 - skin_white_level, 0.23 + skin_white_level)
bpy.data.materials['evabody'].node_tree.nodes['RGB Curves.001'].mapping.update( )

Figure 10:
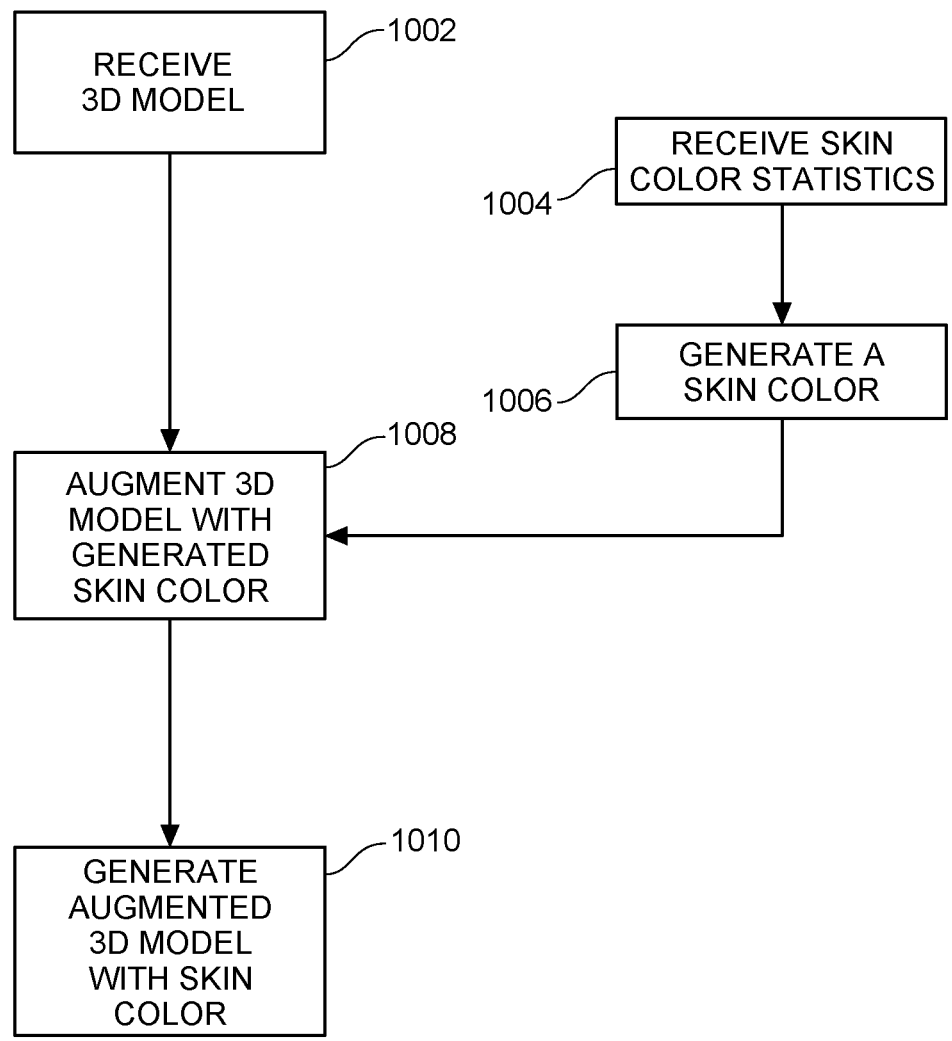
FIG. 10 shows an illustrative process for generating a first type of augmentation data comprising a skin tone.

FIG. 10 shows an illustrative process 1000 for generating a first type of augmentation data comprising a skin tone. This process is in reference to steps 202-208 in FIG. 2, steps 302-208 in FIG. 3, steps 402-408 in FIG. 4, and steps 502-508 in FIG. 5. First, in step 1002, a 3D model is received. In step 1004, skin color statistics are received. Skin color statistics includes information such as the range of skin colors (rendered as red-green-blue or RGB numbers), the quantization of colors in the range, and the relative probabilities of individual humans having each skin color in the range as quantized by the quantization. In some embodiments, these skin color statistics correspond to the entire human worldwide population. In other embodiments, these skin color statistics correspond to the human population for a particular country, region, or ethnic group. In other embodiments, these skin color statistics take into account tanning, tattooing, or other natural or artificial alterations to human skin color.

In step 1006, a skin color is generated from the skin color statistics by choosing a random skin color within the color range in accordance with the associated probabilities. In step 1008, the 3D model received in step 1002 is augmented with the generated skin color to generate an augmented 3D model with the selected skin color in step 1010.

In one embodiment, the skin augmentation may be performed programmatically during the model rendering of the skin using a shader, or a shading program for 3D graphics programs as discussed above. The shader may have red-green-blue (RGB) curves based on skin color statistics that the script may adjust programmatically. For example, first a color feature is selected programmatically. When the script elects to adjust the values of the color feature, a particular base color (cyan, red, green, blue) is selected programmatically by the script, using a color chart with an RGB curve, with a particular color point selected. The script programmatically can cycle through the color point to generates a variety of skin shades or colors. The script may then programmatically apply the selected skin colors to the surface of the model.

Face Augmentation

In one embodiment, face augmentation may be implemented using a partial convolution deep learning network, by 1) firstly, rendering an eye, nose, and mouth-masked image, and 2) secondly, applying a partial convolution deep learning network to the masked image and obtaining a face augmented image. Accordingly, it is possible to obtain a large number of realistic rendered humans with realistic faces from a limited number of 3D body models containing only a few face variations.

Figure 11:
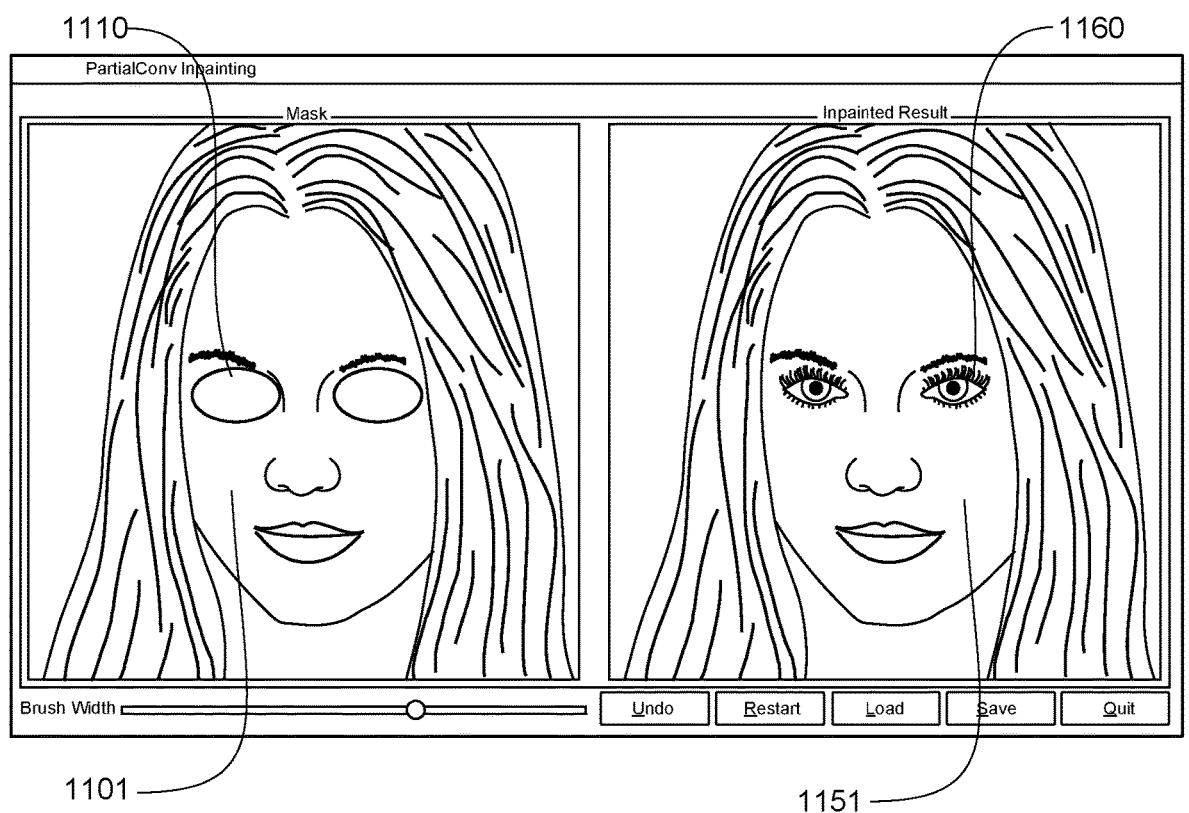
FIG. 11 shows an illustrative process for generating a first type of augmentation data comprising a face augmentation.

FIG. 11 shows an illustrative process 1100 for generating a first type of augmentation data comprising a face augmentation. In particular, the face augmentation may comprise face contours a subject might have, for example, the shapes of the eyes, nose, cheeks, chin, jawline, mouth, and forehead. The face contours are also independent of the body shape of any 3D body model. In process 1100, an input face mask 1101 is selected, and the feature to be augmented is selected, such as the eyes 1110. An output face 1151 is generated comprising the augmented face with the selected feature added, such as eyes 1160.

Figure 12:
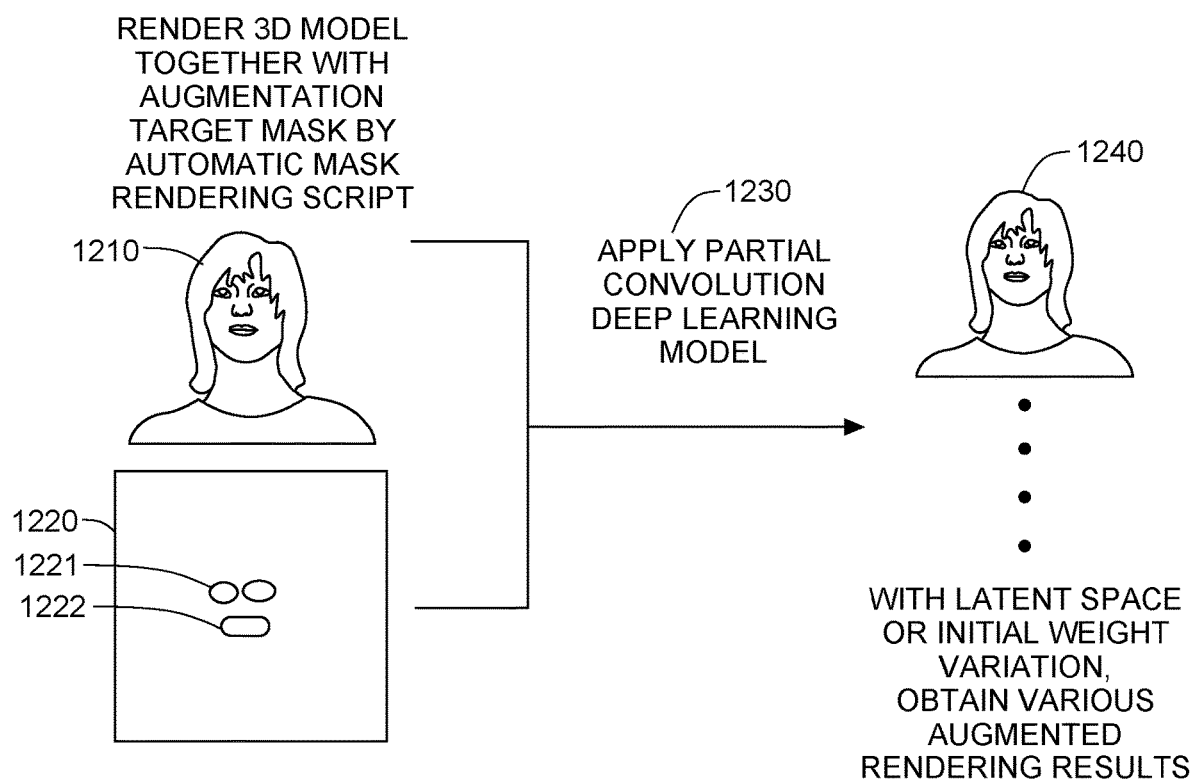
FIG. 12 shows a flow chart of the process for generating the first type of augmentation data comprising the face augmentation.

FIG. 12 shows a flowchart for the process 1200 for generating the first type of augmentation data comprising the face augmentation. In step 1210, a 3D human body model is received. In step 1220, a face mask with features, such as eyes 1221 and mouth 1222, is received. In step 1230, a partial convolution deep learning model is applied to combine the face mask with the 3D human body model. In some embodiments, the partial convolution deep learning model is implemented as described by Guilin Liu, et al., "Image Inpainting for Irregular Holes Using Partial Convolutions," Available at https://arxiv.org/abs/1804.07723, and at https://github.com/NVIDIA/partialconv, the entire disclosures of which are hereby incorporated by reference as if fully set forth herein. This approach makes use of partial convolutions, where the convolution is masked and renormalized to be conditioned on only valid pixels. A mechanism is provided to automatically generate an updated mask for the next layer as part of the forward pass. The resultant face is augmented to the naked 3D body model as described herein.

Hair Augmentation

Another category of first type augmentation data, which can be used either independently of the others or partially dependent, includes hair augmentation. Hair augmentation may comprise various hair styles, hair color, hair texture, and hair partially covering the face or body. In some embodiments, hair augmentation may be performed by an auto-hair algorithm. In some embodiments, the auto-hair algorithm is implemented as described by Menglei Chai, et al., "AutoHair: Fully Automatic Hair Modeling from A Single Image," Available at http://www.kunzhou.net/2016/autohair.pdf, the entire disclosure of which is hereby incorporated by reference as if fully set forth herein. First, given a single image as input, the AutoHair pipeline produces the hair segmentation along with a direction map. This information is then combined with precomputed 3D hair model exemplars, to generate the final strand-level hair model, which may be augmented to the naked 3D body model as described herein.

Light Augmentation

Light augmentation may include simulating various lighting conditions under which a 3D object is imaged or photographed. For example, the angle of light source would affect shadowing, the color of the light source would affect the colors of the subject and surrounding objects, and low lighting conditions would affect the accuracy of determining the edges of physical features. All of these lighting conditions may be cycled through and the first type of augmentation data generated, in order to generate additional realistic data sets for training deep learning networks, in a manner similar to the process employed above for skin color augmentation using the skin shader.

Virtual Clothing Augmentation

Other first types of augmentation data also include, but are not limited to, various virtual clothing, illustrating various clothing that an actual human might be wearing when the photographs may be taken, as discussed above. FIGS. 6A, 6B, 7A, 7B, 9A, and 9B illustrate various virtual clothing models added to a sample 3D base-mesh body model.

Other categories of first type augmentation data are possible, either independently of one another or partially dependent. Other first types of augmentation data are also within the scope of the present invention, and the present invention is not limited to the illustrative first types of augmentation data shown or described herein.

Illustrative Second Types of Augmentation Data

Background Augmentation

As discussed above in reference to FIG. 2, in some embodiments, the second type of augmentation data may be, for example, a plurality (Q) of background images. The background images represent a variety of potential backgrounds that may be observed by subjects in real environments. The background images should be representative of various lighting, shading, locality, and other background conditions that are typical of subjects taking spatial features, such as body measurements. A variety of backgrounds should be selected to optimize the training of the deep learning networks, in particular the segmentation deep learning network as described above.

Noise Augmentation

In other embodiments, the second type of augmentation data may be, for example, white noise or other types of random noise. This may be useful in rendering the deep learning network more robust to imperfect image capturing and other environmental conditions. The noise may be generated by, for example, a random number generator in accordance with a selected probability distribution, such as a Gaussian or uniform distribution. In other embodiments, the noise may be generated from measurements of noise in real-life environments. For example, such noise may arise from dust on the camera lens, smoke or fog in the environment as the photo is taken, or extraneous light (e.g. sunlight reflected directly into the camera lens).

Perspective Distortion Augmentation

In other embodiments, the second type of augmentation data may be, for example, perspective distortion data. When a 2D image is taken of a 3D object or scene from a fixed point, there is a warping or transformation of the object or scene, which differs significantly from what the object would look like if the 2D image were taken from an infinite distance (i.e. 2D projection of a 3D object), due to the relative scale of nearby and distant features. The warping or transformation includes distorting the relative sizes of features based on distance from the fixed point and altering angles. Perspective distortion data comprises information that alter a 2D projection image to what it would be if the image were taken from a particular point. Thus, using perspective distortion data to generate a plurality of 2D images that simulate photographs taken from various focal points trains the DLN to correct for the warping and transformations that occur in real-life photography.

Other second types of augmentation data are also within the scope of the present invention, and the present invention is not limited to the illustrative second types of augmentation data shown or described herein.

Deep Learning Networks and Machine Learning for Body Measurements

Once the deep learning networks have been trained using the synthetized training data as described above, they can be used for accurate measurement determination from 2D photos taken in natural environments. For example, in one embodiment, the trained deep learning networks may be used for highly accurate body part measurements from 2D photos taken of human subjects under typical conditions. The process to utilize the trained deep learning networks for accurate measurement determination is described next.

Figure 13:
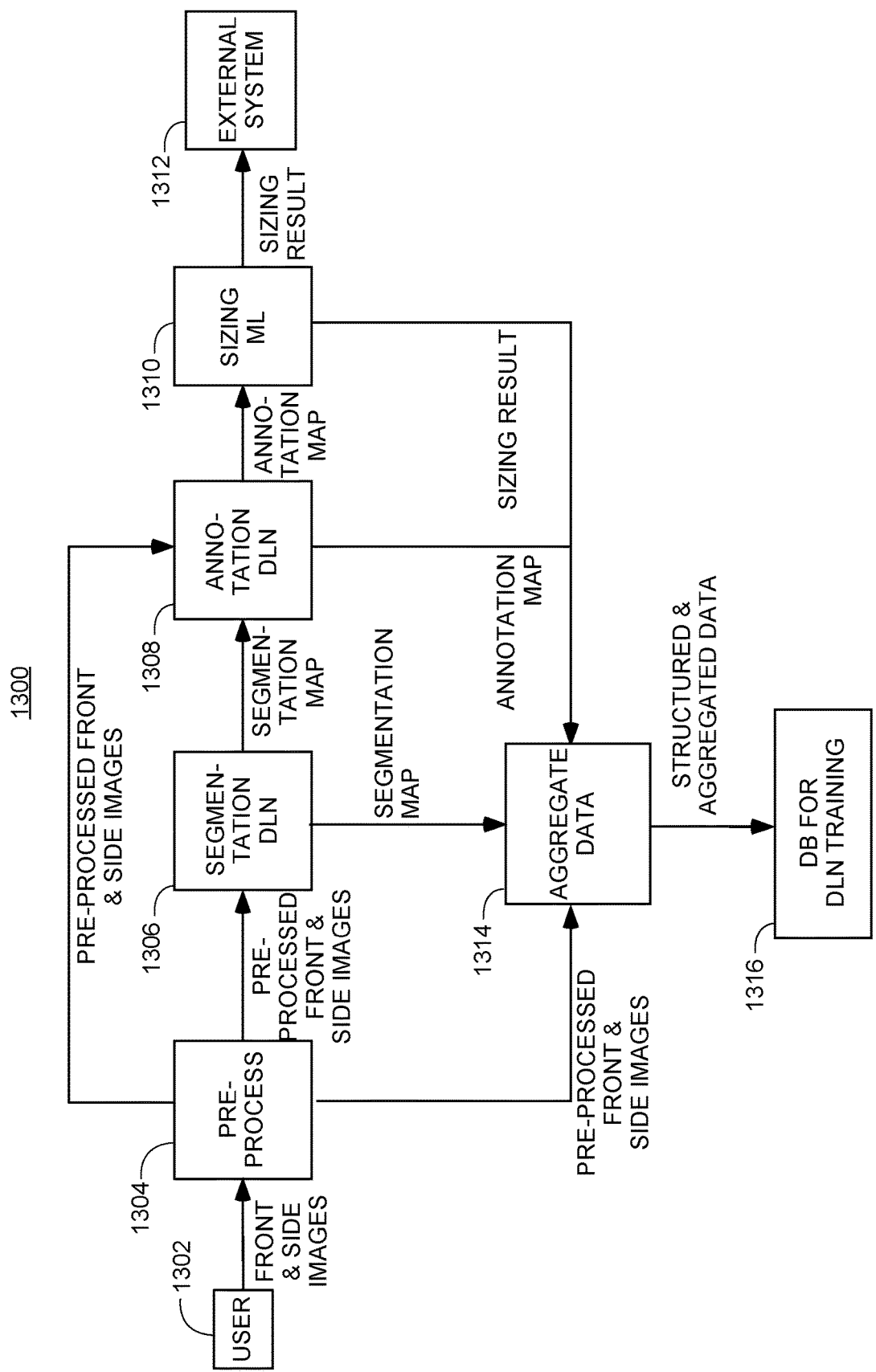
FIG. 13 shows an illustrative architecture for a deep learning network for body measurement determination.

FIG. 13 shows an illustrative architecture 1300 for a deep learning network for body measurement determination (using separate segmentation DLN, annotation DLN, and sizing ML module), in accordance with one embodiment of the invention. In one embodiment, front and side images are received from a user at 1302.

The received front and side images are first pre-processed at 1304. In some embodiments, a pre-processing on the one or more images of the user, such as a perspective correction, may be performed on the front and side view photos, if needed. For example, the system may use OpenCV, an open-source machine vision library, and may make use of features of the head in the front and side view photos and the user's height as references for perspective correction. In this way, embodiments of the disclosure may avoid determining measurements which are inaccurate as far as the proportions of the lengths of the body go, such as torso length and leg length. Optionally, a perspective side photo showing where the camera is positioned relative to the person being photographed may yield even more accurate perspective correction by allowing the system to calculate the distance between the camera and the user. In some embodiments, the system may instead use gyroscope data provided by the user device (or a peripheral device connected to the user device, such as an attached computer device) to detect a photo perspective angle, and perform perspective correction based on this photo perspective angle.

Various computer vision techniques may be utilized to further pre-process the one or more images. Examples of additional pre-processing steps may include, but are not limited to, contrast correction, lighting correction, and other image processing techniques to improve the quality of the one or more images before further processing.

After pre-processing, the pre-processed images are sent to the segmentation DLN at 1306 to generate the segmentation map segmenting the human body parts from the background. The segmentation map is aggregated with the rest of the data at 1314. In parallel to the segmentation, in one embodiment, the pre-processed images are also sent to annotation DLN at 1308 to generate the annotation measurement lines. The annotation map is aggregated with the rest of the data at 1314. The annotation map is provided, in one embodiment, to sizing machine learning (ML) module 1310 to generate the body feature measurements for each body feature that has been segmented and annotated by measuring each annotation line. The sizing result is aggregated with the rest of the data at 1314. The sizing result is output to one or more external system(s) for various uses as described herein at 1312. Finally, all of the aggregated and structured data, (1) the pre-processed front and side images, (2) the segmentation map, (3) the annotation map, and (4) the sizing result, that have been aggregated at 1314 are stored in a database for further DLN training at 1316.

Figure 14:
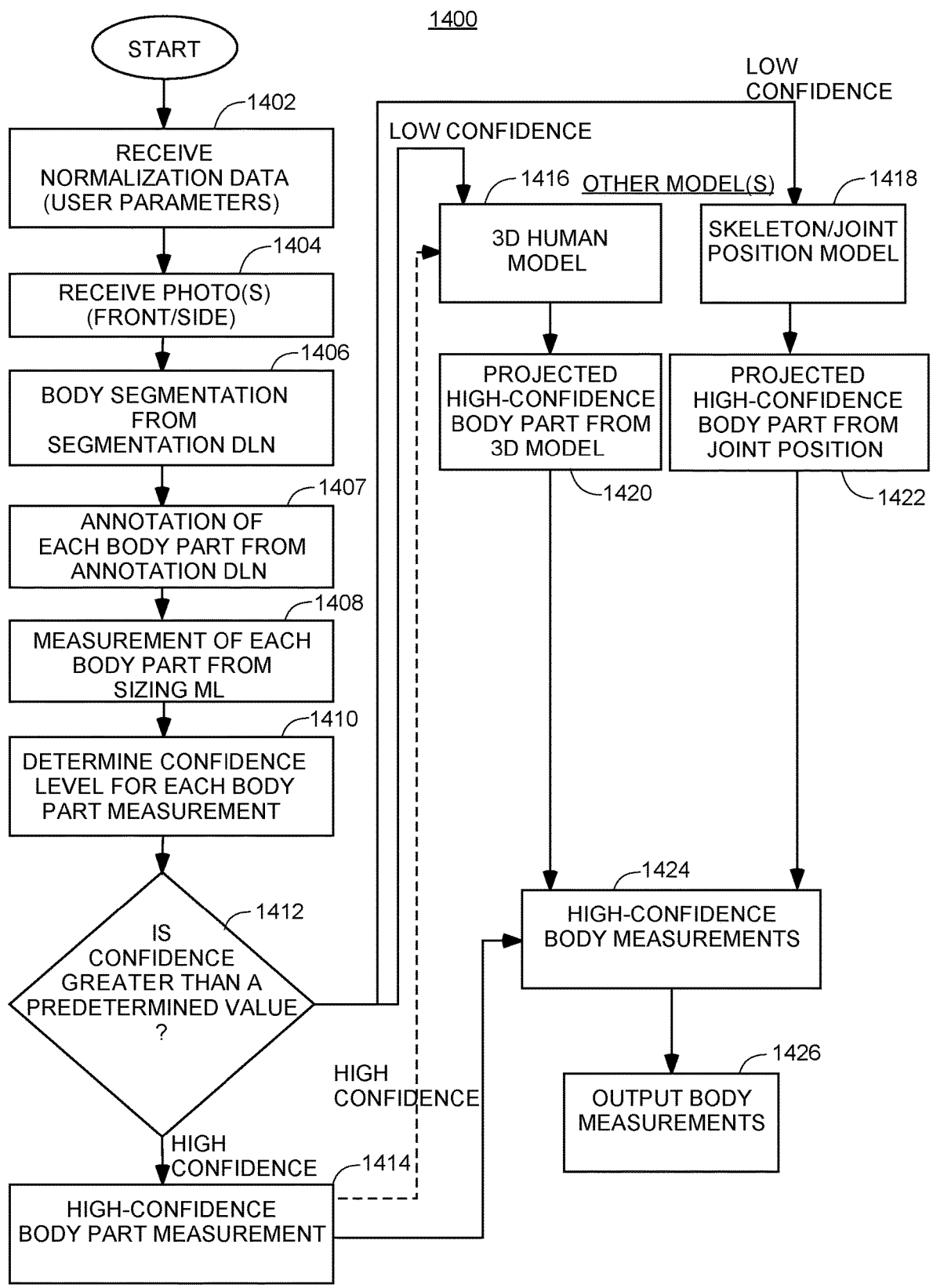
FIG. 14 shows an illustrative flow diagram for a deep learning network for body measurement determination.

FIG. 14 shows a diagram of an example flow 1400 for body measurement determination operations, in accordance with example embodiments of the disclosure. In some embodiments of the prevent invention, computer vision techniques and deep learning are applied to one front view photo and one side view photo of the user, plus the user's height, and possibly other user parameters such as weight, sex, age, etc. and generate full body measurements using one or more deep learning networks that have been trained on segmented and annotated training data as generated following the processes in FIGS. 2-5. As more data is collected by the system, the accuracy of the body measurements automatically improves. Optionally, and according to some other embodiments, perspective correction, human background subtraction, skeleton detection, and 3D model matching approaches, utilizing computer vision techniques, are used to improve on any low-confidence body measurements from the deep learning approach.

The overall process 1400 starts at step 1402, where normalization data (one or more user parameters), such as a height of the user, is obtained, generated, and/or measured in order to perform a normalization or a scaling. In another embodiment, a weight may also be used in conjunction with the height. Both user parameters may be determined automatically (e.g., using computer vision algorithms or mined from one or more databases), or determined from the user (e.g., user input). In one embodiment, from these user parameters, a body mass index (BMI) may be calculated. The BMI may be used to calibrate the body measurement extraction using both the body weight and height. Additional user parameters may include at least one of a height, a weight, a gender, an age, race, country of origin, athleticism, and/or other demographic information associated with the user, among others. The height of the user is used to normalize, or scale, front and/or side-view photos and provide a reference for a human in the photo. The other user parameters, such as the weight, BMI index, age, sex, and so forth, are used as additional inputs into the system to optimize the body sizing measurements. In one embodiment, the other user parameters may also be obtained automatically from the user device, from one or more third-party data sources, or from the server.

At step 1404, one or more user photos may be received; for example, at least one front and/or side view photos of a given user may be received. In another embodiment, the photos may be obtained from the user device (e.g., mobile phone, laptop, tablet, etc.). In another embodiment, the photos may be obtained from a database (e.g., a social media database). In another embodiment, the user photos include a photo showing a front view and a photo showing a side view of the entire body of the user. In some embodiments, only one photo, such as a front view, is utilized and the one photo is sufficient to perform accurate body measurement extraction. In yet other embodiments, three or more photos are utilized, including in some embodiments a front view photo, a side view photo, and a photo taken at a 45 degree angle. Other combinations of user photos are within the scope of the present invention, as would be recognized by one of ordinary skill in the art. In some embodiments, a user video, for example a front view, a 90, 180, or even 360 degree view of the user may be received. From the user video, one or more still frames or photos, such as a front view, a side view, and/or a 45-degree view of the user are extracted from the video and used in the process that follows. Steps 1402 and 1404 may be performed in any order in various embodiments of the present invention, or the two steps may be implemented in parallel.

In one embodiment, the system may automatically calculate (e.g., using one or more AI-algorithms) body measurements using the photos and the normalization data, as further described below in connection with the following steps. In one embodiment, the user may also indicate whether the user is dressed in tight, normal, or loose clothing for more accurate results.

In one embodiment, the images may be taken at a specified distance (e.g., approximately 10 feet away from the camera of a user's device). In one embodiment, the images may be taken with the user having a specific pose (e.g., arms in a predetermined position, legs spread at a shoulder length, back straight, "A-pose," etc.). In another embodiment, multiple images of a given position (e.g., front and side view photos) may be taken and an average image may be determined for each position. This may be performed to increase accuracy. In another embodiment, the user may be positioned against a background of a specific type (e.g., a neutral color, or having a predetermined background image). In some embodiments, the user may be positions against any type of background. In one embodiment, the front and side view photos may be taken under similar lighting conditions (e.g., a given brightness, shadow, and the like). In another embodiment, the front and side view photos may include images of the user wearing normally fitted clothing (e.g., not extra loose or extra tight). Alternatively, or additionally, the front and side view photos may include images of the user partially clothed (e.g., shirtless), or having a different type of fit (e.g., tight, loose, etc.) depending on the needs of the AI-based algorithms and associated processes. At step 1406, a body feature, such as a body part of the human (e.g., a neck, an arm, a leg, etc.) may be extracted from the image using a first deep learning network (DLN) known as a segmentation DLN. In one embodiment, "deep learning" may refer to a class of machine learning algorithms that use a cascade of multiple layers of nonlinear processing units for feature extraction and transformation modeled after neural networks. In one embodiment, the successive layers may use the output from the previous layer as input. In one embodiment, the "deep" in "deep learning" may refer to the number of layers through which the data is transformed. An example of body feature extraction, or body segmentation, is explained and shown in reference to FIGS. 6A, 6B, 7A & 7B.

Before performing this segmentation step on data from a real user, the system may have been trained first, for example, on sample photos of humans posing in different environments in different clothing, or by utilizing the training data generation processes described in relation to FIGS. 2-5. In some embodiments, any suitable deep learning architecture may be used, such as deep neural networks, deep belief networks, and/or recurrent neural networks. In another embodiment, the deep learning algorithms may learn in supervised (e.g., classification) and/or unsupervised (e.g., pattern analysis) manners. Further, the deep learning algorithms may learn multiple levels of representations that correspond to different levels of abstraction of the information encoded in the images (e.g., body, body part, etc.). In another embodiment, the images (e.g., the front and side photos) may be represented as a matrix of pixels. For example, in one embodiment, the first representational layer of the deep learning network may abstract the pixels and encode edges; the second layer may compose and encode arrangements of edges; the third layer may encode a nose and eyes; and the fourth layer may recognize that the image contains a face, and so on.

In one embodiment, the segmentation DLN algorithm may be trained with segmentation training data, as described in relation to FIG. 8B above. In some embodiments, the segmentation training data may include thousands of sample humans with manually-segmented body features or generated by utilizing the training data generation processes described in relation to FIGS. 2-5. In some embodiments, the training data includes medical data, for example from CAT scans, MRI scans, and so forth. In some embodiments, the training data includes data from previous tailor or 3D body measurements that include 3D body scans from 3D body scanners and "ground truth" data. In some embodiments, the 3D body scans may be used to extract approximate front and/or side view photos, in cases where the front and side view photos are not explicitly available, as described in relation to FIGS. 2-5. In some embodiments, the ground truth data comprises human tailor-measured data; while in other embodiments, the ground truth data comprises automatically extracted 1D body size measurements from the 3D body scans.

At step 1407, an annotation line for each body part that was extracted at step 1406 may be drawn using one or more additional deep learning networks (DLNs), for example an annotation DLN. In one embodiment, there is a separate body feature annotation DLN for each body part. In other embodiments, there is one body feature annotation DLN for the entire body. An example of body feature annotation is explained and shown in reference to FIGS. 7A-7B.

In one embodiment, the system may generate and extract body feature measurements by using an AI-based algorithm such as an annotation DLN, for example, by first drawing annotation lines from signals obtained from the body features. Each annotation line may be different for each body feature and may be drawn differently. For example, for the bicep width or circumference, the system may draw a line perpendicular to the skeletal line at the bicep location; for the chest, the system may connect two chest dots instead. From the annotation of each body feature, a body feature measurement may then be obtained by normalizing on the user's height received in step 1402, as described further below.

Before performing this annotation step on data from a real user, the system may have been trained first, for example, on sample photos of humans posing in different environments in different clothing, or by utilizing the training data generation processes described in relation to FIGS. 2-5. The segmentation and annotation DLNs are described in more detail below, in relation to FIG. 15.

At step 1408, a body feature measurement may be estimated for each body part that had an annotation line drawn at step 1407 using one or more machine learning algorithms, for example a sizing machine learning (ML) algorithm. In one embodiment, the sizing ML algorithm comprises a random forest machine learning module. In one embodiment, there is a separate sizing ML module for each body part. In some embodiments, there is one sizing ML module for the entire body. In one embodiment, the system may determine the sizes of the body features using as input the height received in step 1402 to normalize the sizing estimates. In order to do this, the annotation DLN in one embodiment draws a "full body" annotation line indicating a location of the subject's height, with a dot representing a bottom of the subject's feet and another dot representing a top of the subject's head. This "fully body" annotation line is used to normalize other annotation lines by the subject's known height provided in step 1402. In other words, the height of the subject in the image is detected and used along with the known actual height to normalize all annotation line measurements. This process may be thought of as "height reference normalization," using the subject's known height as a standard measurement for normalization. Other normalization factors are possible and within the scope of the present invention, including but not limited to books of known height, standard size papers of known size, standard-issued credit cards of known size, and so forth.

Figure 15:
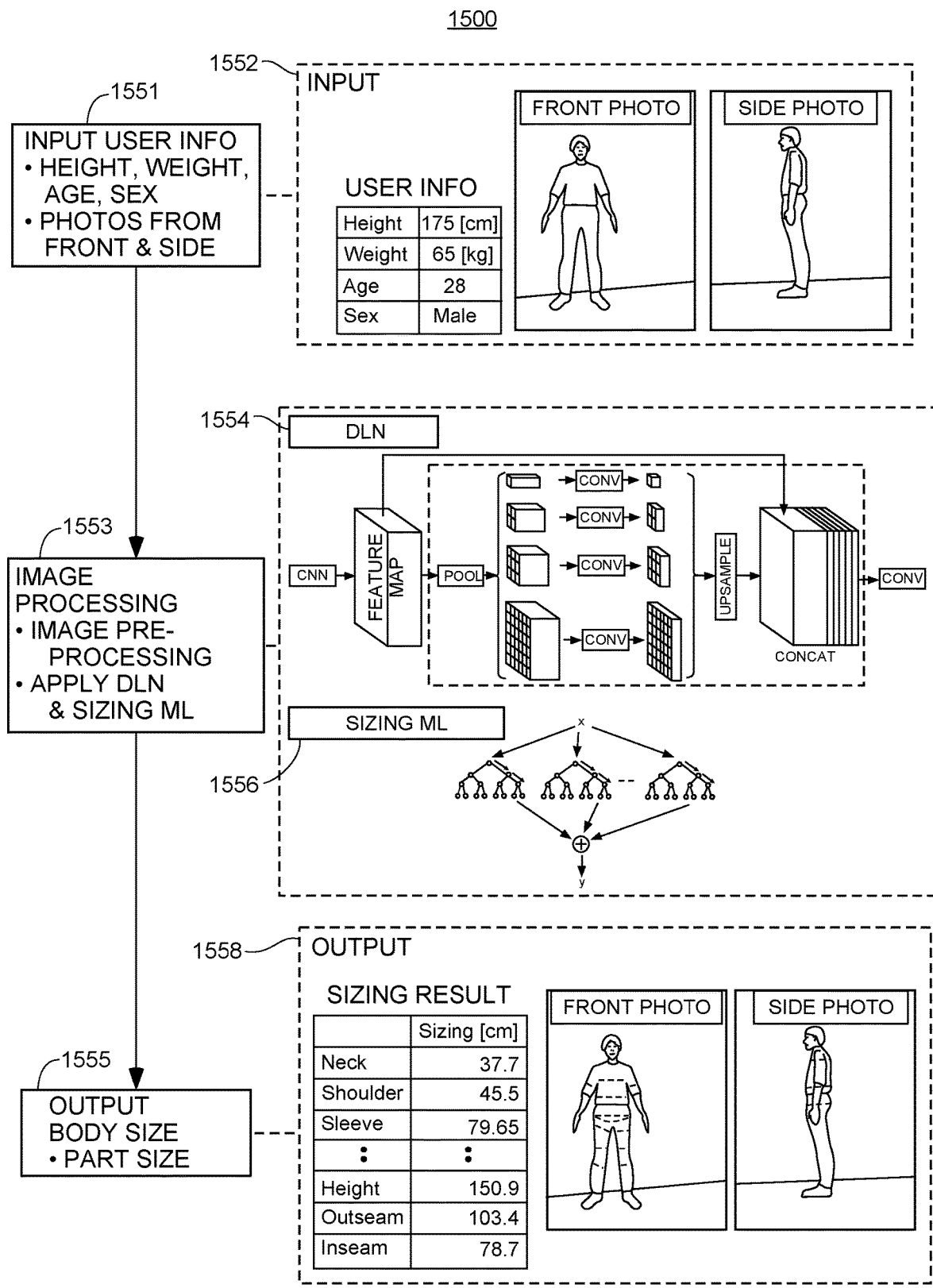
FIG. 15 shows another illustrative flow diagram for a deep learning network for body measurement determination.

In another embodiment, additional user demographic data, such as, but not limited to, weight, a BMI index, a gender, an age, and/or other demographic information associated with the user received in step 1402 is used as input to the sizing ML algorithm (such as random forest), described in greater detail in relation to FIG. 15.

The system may also use other algorithms, means, and medians for each body feature measurement. The annotation DLN and sizing ML may be implemented as one sizing DLN, that annotates and performs measurements on each body feature, or may be implemented as two separate modules, an annotation DLN that annotates each body feature, and a separate sizing ML module that performs the measurements on the annotated body feature. Similarly, various alternative architectures for implementing the segmentation DLN of step 1406, the annotation DLN of step 1407, and the sizing ML module of step 1408 are possible. For example, FIG. 13 corresponds to one possible architecture, in which the segmentation DLN, annotation DLN, and sizing ML module are separate modules. In contrast, an alternative architecture (not shown in FIG. 13) comprises wherein the segmentation DLN and annotation DLN are combined into a single annotation DLN (that effectively performs both segmentation and annotation) followed by a sizing ML module. Finally, yet another alternative architecture (not shown in FIG. 13) in which the segmentation DLN, annotation DLN, and sizing ML module are all combined into a single sizing DLN that effectively performs all functions of segmentation, annotation, and size measurement.

At step 1410, a confidence level for each body feature measurement may be determined, obtained, or received from the sizing ML module from step 1408. In addition to outputting the predicted body measurements for each body feature, the sizing ML module also outputs a confidence level for each predicted body feature measurement, which is then utilized to determine if any other approaches should be utilized to improve on the output, as described below. In another embodiment, the confidence level may be based on a confidence interval. In particular, a confidence interval may refer to a type of interval estimate, computed from the statistics of the observed data (e.g., the front and side photos encoding image data), that might contain the true value of an unknown population parameter (e.g., a measurement of a body part). The interval may have an associated confidence level that may quantify the level of confidence that the parameter lies in the interval. More strictly speaking, the confidence level represents the frequency (i.e. the proportion) of possible confidence intervals that contain the true value of the unknown population parameter. In other words, if confidence intervals are constructed using a given confidence level from an infinite number of independent sample statistics, the proportion of those intervals that contain the true value of the parameter will be equal to the confidence level. In another embodiment, the confidence level may be designated prior to examining the data (e.g., the images and extracted measurements therefrom). In one embodiment, a 95% confidence level is used. However, other confidence levels can be used, for example, 90%, 99%, 99.5%, and so on.

In various embodiments, a confidence interval and corresponding confidence level may be determined based on a determination of a validity and/or an optimality. In another embodiment, validity may refer to the confidence level of the confidence interval holding, either exactly or to a good approximation. In one embodiment, the optimality may refer to a rule for constructing the confidence interval should make as much use of the information in the data-set (images and extracted features and measurements) as possible.

At step 1412, it may be determined whether the confidence level is greater than a predetermined value. If it is determined that the confidence level is greater than the predetermined value, then the process may proceed to step 1414, where the high-confidence body feature measurements may be outputted. If it is determined that the confidence level is less than the predetermined value, then the process may proceed to step 1416 or step 1418. The steps 1416 and 1418 are illustrative of one or more, optional, fallback algorithms for predicting or projecting estimated body feature measurements for those body features for which the deep-learning approach has a low confidence. Together with the high-confidence body feature measurements from the deep-learning approach (shown in dashed lines), and the projected body feature measurements from the alternative fallback algorithms for the low-confidence body feature measurements, are later synthesized into a complete set of high-confidence body feature measurements as described below. As noted, in another embodiment, the confidence level may be designated prior to examining the data (e.g., the images and extracted measurements therefrom).

In particular, at steps 1416 and 1418, other optional models (e.g., AI-based or computer vision-based models) may be applied. At step 1416, and according to one optional embodiment, a 3D human model matching algorithm may be applied. For example, the system may first utilize OpenCV and/or deep learning techniques to extract the human body from the background. The extracted human body is then matched to one or more known 3D human models in order to obtain body feature measurements. Using this technique and a database of existing 3D body scans, for example a database of several thousand 3D body scans, the system may match the closest body detected with the 3D body scans' points. Using the closest matching 3D model, the system may then extract body feature measurements from the 3D model.

Alternatively, and/or additionally, at step 1418, other models, such as a skeleton/joint position model may be applied. In one embodiment, skeleton/joint detection may be performed using OpenPose (discussed further below), an open source algorithm for pose detection. Using this technique to obtain the skeleton and joint positions, the system may then draw lines between the appropriate points, using an additional deep learning network (DLN) if necessary, that indicates positions of the middle of the bone that are drawn on top of the user photos to indicate various key skeletal structures, showing where various body parts, such as the shoulders, neck, and arms are. From this information, body feature measurements may be obtained from the appropriate lines. For example, a line connecting the shoulder and the wrist may be used to determine the arm length.

In one embodiment, the 3D model algorithm and the skeleton/joint position models are combined as follows (though this is not shown explicitly in FIG. 14). Using a database of existing 3D body scans, for example a database of several thousand 3D body scans, the system may match the closest skeleton detection with the 3D body scans' skeleton points, showing points and lines that indicate positions of the bone that indicate various key skeletal structures, showing where various body parts, such as the shoulders, neck, and arms are. Once the closest matching 3D model is matched, the system may extract body feature measurements from the 3D model.

In either or both cases, at step 1420, or at step 1422, or both, the high-confidence body feature measurements may be projected (e.g., estimated). In particular, the estimate of the high-confidence body feature measurement may be performed using a different process from the first, lower-confidence deep-learning process (e.g., that shown and described in connection with step 108, above).

One advantageous feature of this approach is that the high-confidence body feature measurements from step 1414 (shown as a dashed line) may be used as inputs to assist with calibrating the other models, for example the 3D human model algorithm in step 1416 and the skeleton/joint position model in step 1418. That is, the high-confidence body feature measurements from the deep learning approach obtained in step 1408, may be used to assist the other models, for example 3D human model 116 and/or skeleton/joint position model 1418. The other models (1416 and/or 1418) may then be used to obtain projected high-confidence body feature measurements for those body feature measurements that were determined to be have a confidence below a predetermined value in step 1412. Later, the projected high-confidence body feature measurements may replace or supplement the low-confidence body feature measurements from the deep-learning approach.

Further, at step 1424, the high confidence body feature measurements determined at step 1420 and/or step 1422 may be used to determine a high-confidence body feature measurement. In such a way, various models, that is, the 3D human model and the skeleton/joint position model, may both be used to further improve the accuracy of the body feature measurements obtained in step 1414. Therefore, the high-confidence body feature measurements are aggregated—the high-confidence body feature measurements from step 1414 (e.g., the deep-learning approach) are combined with the projected high-confidence body feature measurements from steps 1420 and 1422 (e.g., the other models).

At step 1426, the high-confidence body feature measurements are aggregated into complete body measurements of the entire human body and are then output for use. In particular, the body measurements may be output to a user device and/or a corresponding server, for example associated with a company that manufactures clothing based on the measurements. In one embodiment, the output may be in the form of a text message, an email, a textual description on a mobile application or website, combinations thereof, and the like. The complete body measurements may then be used for any purposes, including but not limited to custom garment generation. One of ordinary skill in the art would recognize that the output of the complete body measurements may be utilized for any purpose in which accurate and simple body measurements are useful, such as but not limited to fitness, health, shopping, and so forth.

FIG. 15 shows another example flow diagram 1500 for body measurement determination using deep learning networks (DLNs) and machine learning, in accordance with another embodiment of the invention. In step 1551, input data 1552, which comprises a front photo, side photo, and user parameters (height, weight, age, sex, etc.) are received. In step 1553, one or more image processing steps are applied. First, optional image pre-processing (perspective correction, human cropping, resizing etc.) steps may be performed. Next, the deep-learning network (DLN) 1554 is applied to the images for segmenting and annotating the body features. Next, the sizing machine learning module (ML) 1556 is applied to the annotated body features for determining the body size measurements from the annotation lines and one or more of the user parameters. Finally, in step 1555, the body size measurements (for example, 16 standard body part sizes) are output, shown illustratively as output data 1558. The output 1558 may include the sizing result (a set of standard body size measurements, such as neck, shoulder, sleeve, height, outseam, inseam, etc.), and may also include the front and side photos annotated with the annotation lines.

As shown in FIG. 15, and according to one embodiment, the body part segmentation and annotation is performed using a deep learning network (DLN) 1554. In one embodiment, the body part segmentation and annotation are performed using a convolutional neural network (CNN) combined with a pyramid scene parsing network (PSPNet) for improved global and local context information. In a PSPNet, the process may utilize global & local context information from different sized regions that are aggregated through a pyramid pooling module. As shown in FIG. 15, the input image is first passed through a convolutional neural network (CNN) to obtain a feature map which classifies or segments each pixel into a given body part and/or annotation line. Next, global & local context information is extracted from the feature map utilizing a pyramid pooling module, which aggregates information from the image on different size scales. Finally, the data is passed through a final convolution layer to classify each pixel into body part segments and/or annotation lines.

In one embodiment, the PSPNet algorithm may be implementation as described in Hengshuang Zhao, et al., "Pyramid Scene Parsing Network," CVPR 2017, Dec. 4, 2016, available at arXiv:1612.01105. PSPNet is only one illustrative deep learning network algorithm that is within the scope of the present invention, and the present invention is not limited to the use of PSPNet. Other deep learning algorithms are also within the scope of the present invention. For example, in one embodiment of the present invention, a convolutional neural network (CNN) is utilized to extract the body segments (segmentation), and a separate CNN is used to annotate each body segment (annotation).

Various illustrative machine learning algorithms 1556 for body measurement determination can predict measurement values from one or more feature values obtained from the deep learning networks (DLNs). In one embodiment, the body part sizing is determined using a random forest algorithm 1556, one illustrative machine learning algorithm. Random forest algorithms use a multitude of decision tree predictors, such that each decision tree depends on the values of a random subset of the training data, which minimizes the chances of overfitting to the training data set. In one embodiment, the random forest algorithm is implementation as described in Leo Breiman, "Random Forests," Machine Learning, 45, 5-32, 2001, Kluwer Academic Publishers, Netherlands, available at doi.org/10.1023/A:1010933404324. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention. The input to the machine learning algorithm is the features values (x), which comprise the circumferences of the body parts obtained from the deep-learning networks, the height, and the other user parameters, as shown in FIG. 15. The output of the machine learning algorithm are the predicted values for the sizing measurements (y).

As noted, embodiments of devices and systems (and their various components) described herein can employ artificial intelligence (AI) to facilitate automating one or more features described herein (e.g., providing body extraction, body segmentation, measurement extraction, and the like). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier may map an input attribute vector, $z=(z1, z2, z3, z4, \ldots, zn)$, to a confidence that the input belongs to a class, as by $f(z)=\text{confidence(class)}$. Such classification may employ a probabilistic and/or statistical-based analysis (e.g., factoring into the analysis utilities and costs) to determinate an action to be automatically performed. Another example of a classifier that can be employed is a support vector machine (SVM). The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 16:
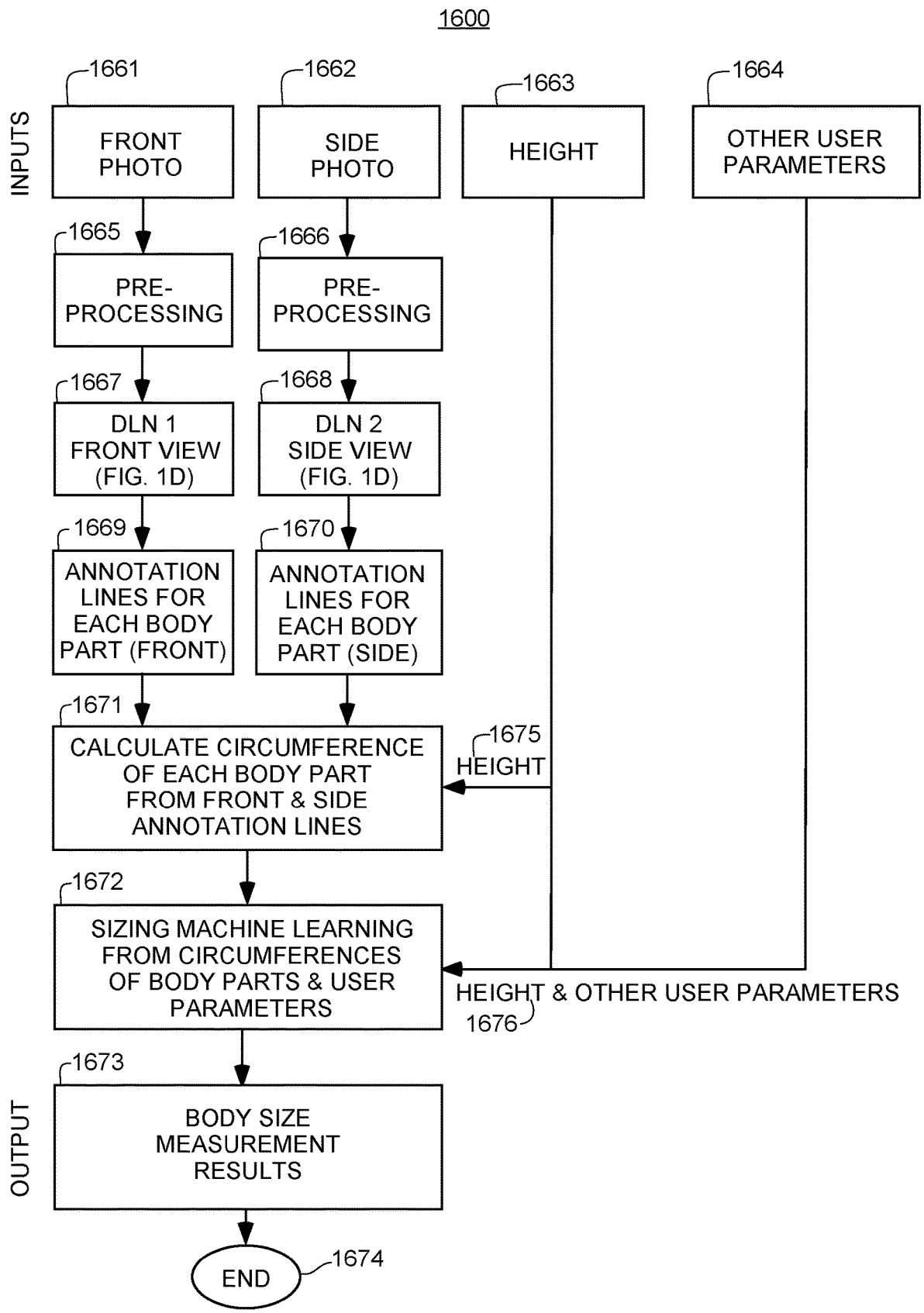
FIG. 16 shows yet another illustrative flow diagram for a deep learning network for body measurement determination.

FIG. 16 shows another detailed flow diagram 1600 for body measurement determination using deep learning networks (DLNs) and machine learning, in accordance with another embodiment of the invention. Inputs to the body measurement process include front photo 1661, side photo 1662, height 1663, and other user parameters (weight, age, sex, etc.) 1664. The front photo 1661 is pre-processed in step 1665, while the side photo 1662 is pre-processed in step 1666. Examples of pre-processing steps, such as perspective correction, human cropping, image resizing, etc. were previously discussed. At step 1667, the pre-processed front photo is used as input to DLN 1 to extract annotation lines for the front photo 1661. At step 1668, the pre-processed side photo is used as input to DLN 2 to analogously extract annotation lines for the side photo 1661. The annotation lines for each body part from the front view 1669 are output from DLN 1 and the annotation lines for each body part from the side view 1670 are output from DLN 2. At step 1671, the two sets of annotation lines from the front photo 1661 and the side photo 1662 are utilized along with the height normalization reference 1675 received from height input 1663 to calculate a circumference of each body part. At step 1672, the circumference of each body part, along with the height and other user parameters 1676 received from inputs 1663 and 1664 are utilized in a machine learning algorithm, such as random forest, to calculate one or more body size measurements. At step 1673, the body size measurement results (length of each standard measurement) are output. Finally, the body measurement process ends at step 1674.

Hardware, Software, and Cloud Implementation of the Present Invention

As discussed, the data (e.g., photos, textual descriptions, and the like) described throughout the disclosure can include data that is stored on a database stored or hosted on a cloud computing platform. It is to be understood that although this disclosure includes a detailed description on cloud computing, below, implementation of the teachings recited herein are not limited to a cloud computing environment. Rather, embodiments of the present invention are capable of being implemented in conjunction with any other type of computing environment now known or later developed.

Cloud computing can refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics may include one or more of the following. On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

In another embodiment, Service Models may include the one or more of the following. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may include one or more of the following. Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The cloud computing environment may include one or more cloud computing nodes with which local computing devices used by cloud consumers, such as, for example, personal digital assistant (PDA) or cellular telephone, desktop computer, laptop computer, and/or automobile computer system can communicate. Nodes can communicate with one another. They can be group physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be exemplary only and that computing nodes and cloud computing environment can communicate with any type of computerized device over any type of network and/or network addressable connection (e.g., using a web browser).

Figure 17:
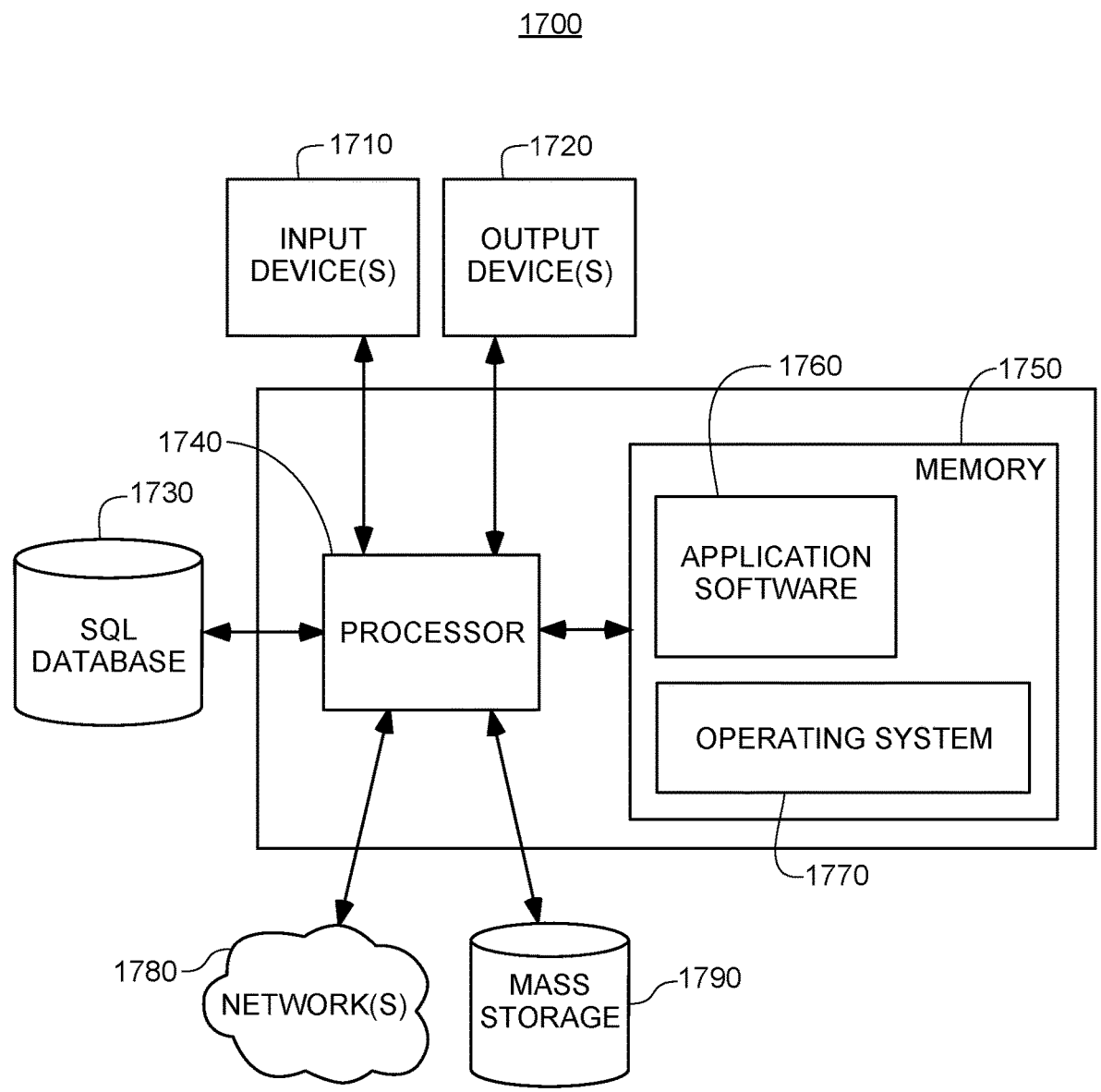
FIG. 17 shows an illustrative hardware architecture diagram of a computing device for implementing one embodiment of the present invention.

The present invention may be implemented using server-based hardware and software. FIG. 17 shows an illustrative hardware architecture diagram 1700 of a server for implementing one embodiment of the present invention. Many components of the system, for example, network interfaces etc., have not been shown, so as not to obscure the present invention. However, one of ordinary skill in the art would appreciate that the system necessarily includes these components. A user-device is a hardware that includes at least one processor 1740 coupled to a memory 1750. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs 1710 and outputs 1720 for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices 1790, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface one or more external SQL databases 1730, as well as one or more networks 1780 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system 1770, and executes various computer software applications 1760, components, programs, codes, libraries, objects, modules, etc. indicated collectively by reference numerals to perform the methods, processes, and techniques described above.

Figure 18:
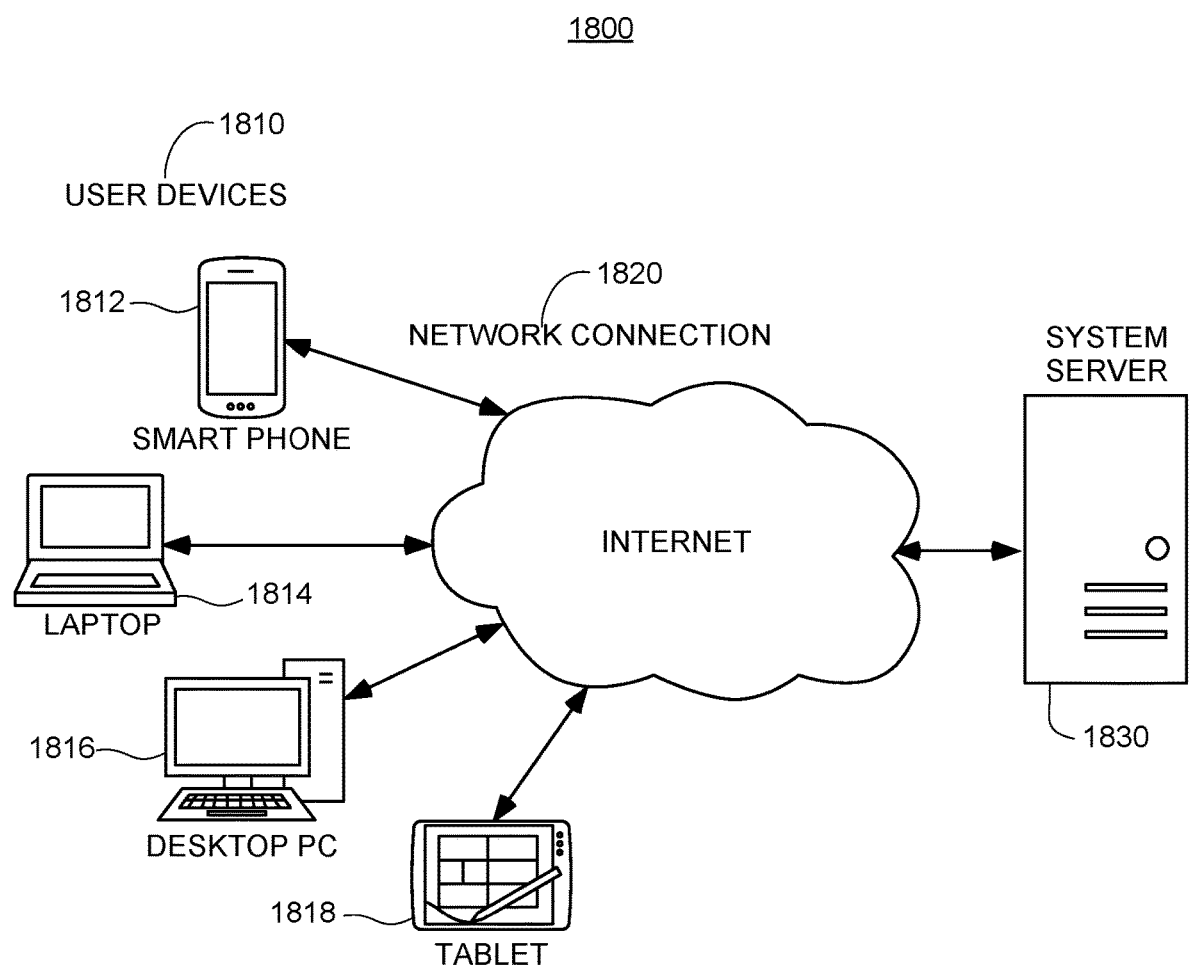
FIG. 18 shows an illustrative system architecture diagram for implementing one embodiment of the present invention in a client server environment.

The present invention may be implemented in a client server environment. FIG. 18 shows an illustrative system architecture 1800 for implementing one embodiment of the present invention in a client server environment. User devices 1810 on the client side may include smart phones 1812, laptops 1814, desktop PCs 1816, tablets 1818, or other devices. Such user devices 1810 access the service of the system server 1830 through some network connection 1820, such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Example Use Cases of the Present Invention

Figure 19:
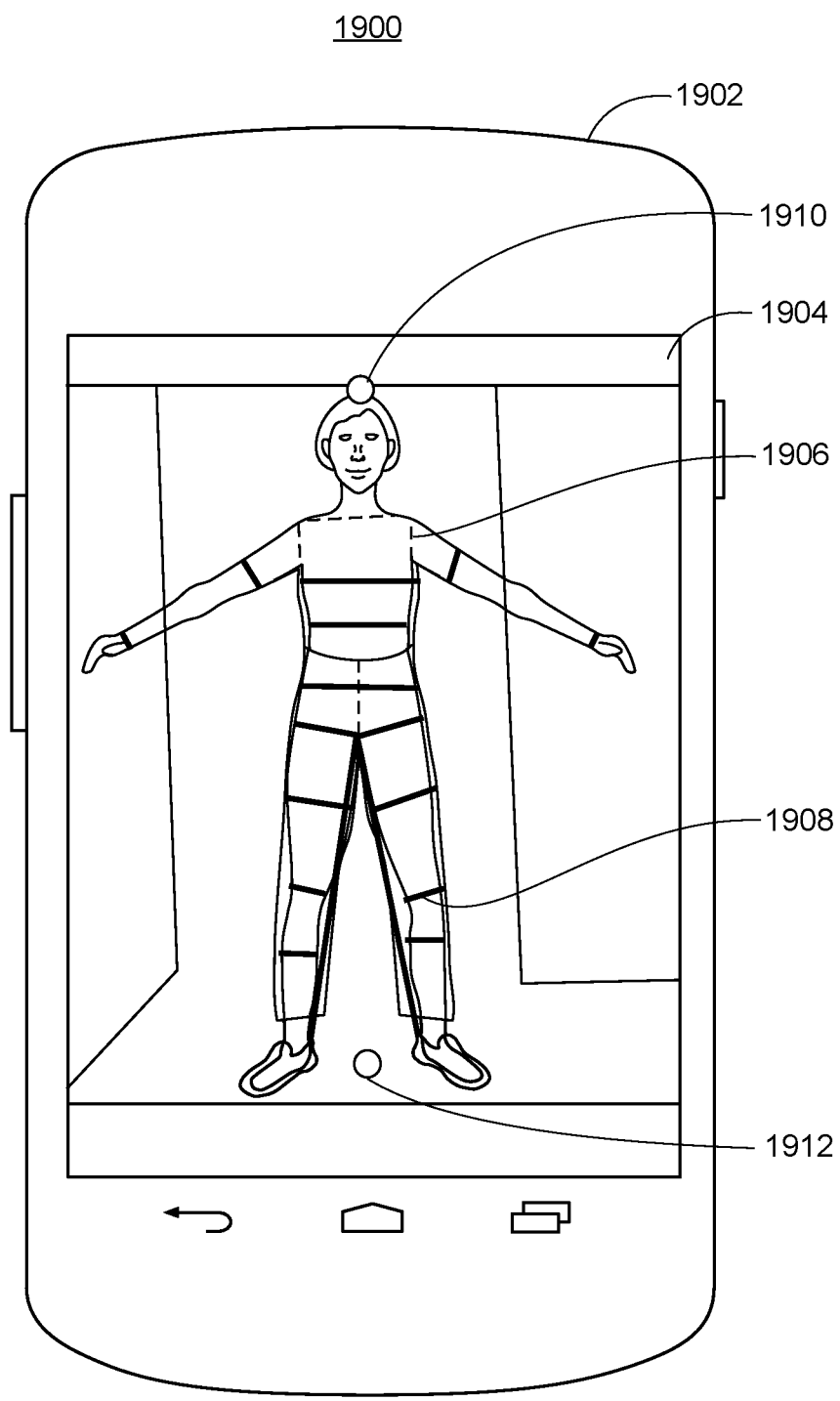
FIG. 19 shows an illustrative diagram of a use case of the present invention in which a single camera on a mobile device is used to capture human body measurements, showing a front view of a human in typical clothing standing against a standard background.

FIG. 19 is an illustrative diagram 1900 of a use case of the present invention in which a single camera on a mobile device 1902 is used to capture human body measurements, showing a front view of a human in typical clothing standing against a normal background. In illustrative diagram 1900, the mobile device 1902 has a display 1904, which displays a human figure. In one embodiment, the human figure torso is identified by, for example, dotted lines 1906, body segments are identified by, for example, solid lines 1908. The top of the head is identified by, for example, a first circular dot 1910, and the bottom of the feet are identified by, for example, a second circular dot 1912. The mobile device shown in FIG. 19 comprises at least one camera, a processor, a non-transitory storage medium, and a communication link to a server. In one embodiment, the one or more photos of the user's body are transmitted to a server that performs the operations described herein. In one embodiment, the one or more photos of the user's body are analyzed locally by the processor of the mobile device 1902. The operations performed return one or more body measurements, which may be stored on the server, as well as presented to the user. In addition, the body measurements may then be utilized for many purposes, including but not limited to, offering for sale to the user one or more custom garments, custom glasses, custom gloves, custom body suites, custom PPE (personal protection equipment), custom hats, custom diet regiments, custom exercise, gym, and workout routines, and so on. Without loss of generality, the body measurements may be output, transmitted, and/or utilized for any purpose for which body measurements are useful.

The present invention has been successfully implemented resulting in sub 1 cm accuracy body measurements relative to a human tailor. The system is able to use just two photos and achieve accuracy comparable to a human tailor. The system does not require the use of any specialized hardware sensors, does not require the user to stand against any special background, does not require special lighting, can be used with photos taken at any distance, and with the user wearing any type of clothing. The result is a body measurement system that works with any mobile device so that anyone can easily take photos of themselves and benefit from automatic full body measurement extraction.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method for generating training data sets for training a deep learning network (DLN) for spatial feature extraction from two-dimensional (2D) images of a three-dimensional (3D) object, the computer-implemented method executable by a hardware processor, the method comprising:
   receiving a 3D model of the 3D object;
   extracting spatial features from the 3D model;
   generating a first type of augmentation data for the 3D model;
   augmenting the 3D model with the first type of augmentation data to generate an augmented 3D model;
   generating at least one 2D image from the augmented 3D model by performing a projection of the augmented 3D model onto at least one plane; and
   generating a training data set to train the deep learning network (DLN) for spatial feature extraction by aggregating the spatial features and the at least one 2D image.

2. The computer-implemented method of claim 1, wherein the 3D model is a 3D human body model.

3. The computer-implemented method of claim 2, wherein the spatial features are one-dimensional (1D) body measurements.

4. The computer-implemented method of claim 2, wherein the spatial features are 2D body segments.

5. The computer-implemented method of claim 1, wherein the first type of augmentation data is selected from the group consisting of skin color, face contour, hair style, and virtual clothing.

6. The computer-implemented method of claim 1, wherein the first type of augmentation data is lighting conditions.

7. The computer-implemented method of claim 1, further comprising:
generating a second training data set from a second 3D model to train the deep learning network for spatial feature extraction,
wherein the second training data set comprises a second plurality of spatial features, a second plurality of augmented 3D models, and a second plurality of 2D images.

8. The computer-implemented method of claim 7, further comprising:
training the deep learning network for spatial feature extraction using the second training data set.

9. The computer-implemented method of claim 1, wherein the at least one 2D image is selected from the group consisting of a front-view image of the 3D model, a side-view image of the 3D model, and an image projected from the 3D model at an angle of 45 degrees with respect to the front-view image.

10. The computer-implemented method of claim 1, wherein the 3D model is a 3D body model and the method further comprises:
training a sizing machine-learning module, wherein the sizing machine-learning module is trained on ground truth data comprising 1D body measurements extracted from the 3D body model.

11. The computer-implemented method of claim 10, wherein the sizing machine-learning module is trained on ground truth data comprising the 1D body measurements extracted from the 3D body model and one or more user parameters associated with the 3D body model.

12. The computer-implemented method of claim 11, wherein the user parameters are selected from the group consisting of a height, a weight, a gender, an age, and a demographic information associated with the user.

13. The computer-implemented method of claim 10, wherein the sizing machine-learning module comprises a random forest algorithm.

14. The computer-implemented method of claim 1, wherein the 3D model comprises at least one 3D body model of a fully-nude user or a partially-nude user.

15. The computer-implemented method of claim 1, wherein the deep learning network (DLN) comprises a convolutional neural network (CNN).

16. The computer-implemented method of claim 15, wherein the deep learning network (DLN) further comprises a pyramid pooling module.

17. The computer-implemented method of claim 1, wherein the at least one 3D model is received from a 3D scanner.

18. The computer-implemented method of claim 1, further comprising:
training the deep learning network (DLN) for body measurement determination using the training data set.

19. A computer program product for generating training data sets for training deep learning networks for spatial feature extraction from two-dimensional (2D) images of a three-dimensional (3D) object, comprising a non-transitory computer readable storage medium having program instructions embodied therein, the program instructions executable by a processor to cause the processor to:
receive a 3D model of the 3D object;
extract spatial features from the 3D model;
generate a first type of augmentation data for the 3D model;
augment the 3D model with the first type of augmentation data to generate an augmented 3D model;
generate at least one 2D image from the augmented 3D model by performing a projection of the augmented 3D model onto at least one plane; and
generate a training data set to train the deep learning network (DLN) for spatial feature extraction by aggregating the spatial features and the at least one 2D image.

20. A system for generating training data sets for training deep learning networks for spatial feature extraction from two-dimensional (2D) images of a three-dimensional (3D) object, the system comprising:
at least one processor; and
at least one non-transitory computer readable storage medium having program instructions embodied therein, the program instructions executable by the at least one processor to cause the at least one processor to:
receive a 3D model of the 3D object;
extract spatial features from the 3D model;
generate a first type of augmentation data for the 3D model;
augment the 3D model with the first type of augmentation data to generate an augmented 3D model;
generate at least one 2D image from the augmented 3D model by performing a projection of the augmented 3D model onto at least one plane; and
generate a training data set to train the deep learning network (DLN) for spatial feature extraction by aggregating the spatial features and the at least one 2D image.

* * * * *